United States Patent
Huen et al.

(10) Patent No.: US 11,048,411 B2
(45) Date of Patent: *Jun. 29, 2021

(54) METHOD OF CONSOLIDATING DATA STREAMS FOR MULTI-STREAM ENABLED SSDS

(71) Applicant: Samsung Electronics Co., Ltd., Suwon-si (KR)

(72) Inventors: Hingkwan Huen, Daly City, CA (US); Changho Choi, San Jose, CA (US)

(73) Assignee: SAMSUNG ELECTRONICS CO., LTD.

(*) Notice: Subject to any disclaimer, the term of this patent is extended or adjusted under 35 U.S.C. 154(b) by 0 days.

This patent is subject to a terminal disclaimer.

(21) Appl. No.: 16/866,545

(22) Filed: May 4, 2020

(65) Prior Publication Data
US 2020/0264774 A1 Aug. 20, 2020

Related U.S. Application Data

(63) Continuation of application No. 16/219,936, filed on Dec. 13, 2018, now Pat. No. 10,739,995, which is a
(Continued)

(51) Int. Cl.
*G06F 3/06* (2006.01)

(52) U.S. Cl.
CPC .......... *G06F 3/0605* (2013.01); *G06F 3/0635* (2013.01); *G06F 3/0659* (2013.01); *G06F 3/0679* (2013.01); *G06F 2212/7207* (2013.01)

(58) Field of Classification Search
CPC .... G06F 3/0605; G06F 3/0659; G06F 3/0679; G06F 3/0635
See application file for complete search history.

(56) References Cited

U.S. PATENT DOCUMENTS

| 8,429,658 B2 | 4/2013 | Auerbach et al. |
| 8,688,894 B2 | 4/2014 | Kuehne |

(Continued)

FOREIGN PATENT DOCUMENTS

| JP | 2006235960 A | 9/2006 |
| JP | 5723812 B2 | 5/2015 |

(Continued)

OTHER PUBLICATIONS

Final Office Action for U.S. Appl. No. 15/821,708, dated May 20, 2020.
(Continued)

*Primary Examiner* — Kalpit Parikh
(74) *Attorney, Agent, or Firm* — Renaissance IP Law Group LLP

(57) ABSTRACT

A Solid State Drive (SSD) is disclosed. The SSD may include a flash memory to store data and support for a number of device streams. The SSD may also include an SSD controller to manage reading data from and writing data to the flash memory. The SSD may also include a host interface logic, which may include a receiver to receive the commands associated with software streams from a host, a timer to time a window, a statistics collector to determine values for at least one criterion for the software streams from the commands, a ranker to rank the software streams according to the values, and a mapper to establish a mapping between the software streams and device streams.

20 Claims, 13 Drawing Sheets

Related U.S. Application Data continuation of application No. 15/458,968, filed on Mar. 14, 2017, now Pat. No. 10,216,417.

(60) Provisional application No. 62/448,958, filed on Jan. 20, 2017, provisional application No. 62/413,177, filed on Oct. 26, 2016.

(56) References Cited

U.S. PATENT DOCUMENTS

| | | |
|---|---|---|
| 8,874,835 B1 | 10/2014 | Davis et al. |
| 8,886,880 B2 | 11/2014 | Barrell et al. |
| 9,158,687 B2 | 10/2015 | Barrell et al. |
| 9,459,810 B2 | 10/2016 | Benisty et al. |
| 9,594,513 B1 | 3/2017 | Delgado et al. |
| 9,854,270 B2 | 12/2017 | Ramasubramonian et al. |
| 10,095,613 B2 | 10/2018 | Jo et al. |
| 2009/0119352 A1 | 5/2009 | Branda et al. |
| 2012/0072798 A1 | 3/2012 | Unesaki et al. |
| 2012/0110239 A1 | 5/2012 | Goss et al. |
| 2012/0191900 A1 | 7/2012 | Kunimatsu et al. |
| 2013/0159626 A1 | 6/2013 | Katz et al. |
| 2014/0189270 A1 | 7/2014 | Iwanicki et al. |
| 2015/0169449 A1 | 6/2015 | Barrell et al. |
| 2015/0370630 A1 | 12/2015 | Yang |
| 2016/0162203 A1 | 6/2016 | Grimsrud |
| 2016/0179386 A1 | 6/2016 | Zhang |
| 2016/0253257 A1 | 9/2016 | Kim et al. |
| 2016/0266792 A1 | 9/2016 | Amaki et al. |
| 2016/0283116 A1 | 9/2016 | Ramalingam |
| 2016/0283124 A1 | 9/2016 | Hashimoto et al. |
| 2016/0283125 A1 | 9/2016 | Hashimoto et al. |
| 2016/0291872 A1 | 10/2016 | Hashimoto et al. |
| 2016/0299715 A1 | 10/2016 | Hashimoto et al. |
| 2016/0306552 A1 | 10/2016 | Liu et al. |
| 2016/0313943 A1 | 10/2016 | Hashimoto et al. |
| 2017/0031631 A1 | 2/2017 | Lee et al. |
| 2017/0075614 A1 | 3/2017 | Kanno |
| 2017/0153848 A1 | 6/2017 | Martineau et al. |
| 2018/0039448 A1 | 2/2018 | Harasawa et al. |
| 2018/0276118 A1 | 9/2018 | Yanagida |

FOREIGN PATENT DOCUMENTS

| | | |
|---|---|---|
| JP | 2016095828 A | 5/2016 |
| JP | 2016170583 A | 9/2016 |
| KR | 20150028610 A | 3/2015 |
| KR | 101544309 B1 | 8/2015 |
| TW | 201510722 A | 3/2015 |
| TW | 201536038 A | 9/2015 |
| WO | 2012020544 A1 | 2/2012 |
| WO | 2015005634 A1 | 1/2015 |

OTHER PUBLICATIONS

Advisory Action for U.S. Appl. No. 15/620,814, dated May 13, 2019.
Final Office Action for U.S. Appl. No. 15/458,968, dated Jul. 27, 2018.
Final Office Action for U.S. Appl. No. 15/620,814, dated Feb. 21, 2019.
Final Office Action for U.S. Appl. No. 15/620,814, dated Sep. 18, 2019.
Final Office Action for U.S. Appl. No. 15/821,708, dated Jun. 20, 2019.
Notice of Allowance for U.S. Appl. No. 15/458,968, dated Oct. 12, 2018.
Notice of Allowance for U.S. Appl. No. 15/620,814, dated Feb. 26, 2020.
Notice of Allowance for U.S. Appl. No. 16/219,936, dated Apr. 2, 2020.
Office Action for U.S. Appl. No. 15/458,968, dated Apr. 10, 2018.
Office Action for U.S. Appl. No. 15/620,814, dated Jul. 17, 2019.
Office Action for U.S. Appl. No. 15/620,814, dated Jun. 19, 2018.
Office Action for U.S. Appl. No. 15/620,814, dated Oct. 18, 2018.
Office Action for U.S. Appl. No. 15/821,708, dated Jan. 22, 2020.
Office Action for U.S. Appl. No. 15/821,708, dated Jan. 24, 2019.
Office Action for U.S. Appl. No. 16/219,936, dated Oct. 4, 2019.
Kang, Jeong-Uk, et al., "The Multi-streamed Solid-State Drive," HotStorage 14, 6th USENIX Workshop on Hot Topics in Storage and File Systems, Jun. 2014.
Notice of Allowance for U.S. Appl. No. 15/821,708, dated Jul. 29, 2020.

METHOD OF CONSOLIDATING DATA STREAMS FOR MULTI-STREAM ENABLED SSDS

RELATED APPLICATION DATA

This application is a continuation of U.S. U.S. patent application Ser. No. 16/219,936, filed Dec. 13, 2018, now allowed, which is a continuation of U.S. patent application Ser. No. 15/458,968, filed Mar. 14, 2017, now U.S. Pat. No. 10,216,417, issued Feb. 26, 2019, which claims the benefit of U.S. Provisional Patent Application Ser. No. 62/448,958, filed Jan. 20, 2017, and U.S. Provisional Patent Application Ser. No. 62/413,177, filed Oct. 26, 2016, all of which are incorporated by reference herein for all purposes.

This application is related to U.S. patent application Ser. No. 15/167,974, filed May 27, 2016, now U.S. Pat. No. 10,592,171, issued Mar. 17, 2020, which claims the benefit of U.S. Provisional Patent Application Ser. No. 62/309,446, filed Mar. 16, 2016, both of which are incorporated by reference herein for all purposes.

FIELD

The inventive concepts relate generally to Solid State Drives (SSDs), and more particularly to managing streams in multi-stream SSDs.

BACKGROUND

Multi-streaming Solid State Drives (SSDs) allow smart placement of incoming data to minimize the effect of internal garbage collection (GC) and to reduce write amplification. Multi-streaming may be achieved by adding a simple tag (a stream ID) to each of the write requests sent from the host to the SSD. Based on this tag, the SSD may group data into common blocks.

In large computer systems, applications may open many files simultaneously. Ideally, each file type should have its own stream ID assigned when performing stream writes. However, SSDs only support a limited number of active write streams to be available at one time, which often it is not enough to cover all files opened by the system.

A need remains for a way to manage mapping streams from the host machine to the SSD.

DETAILED DESCRIPTION

Figure 1:
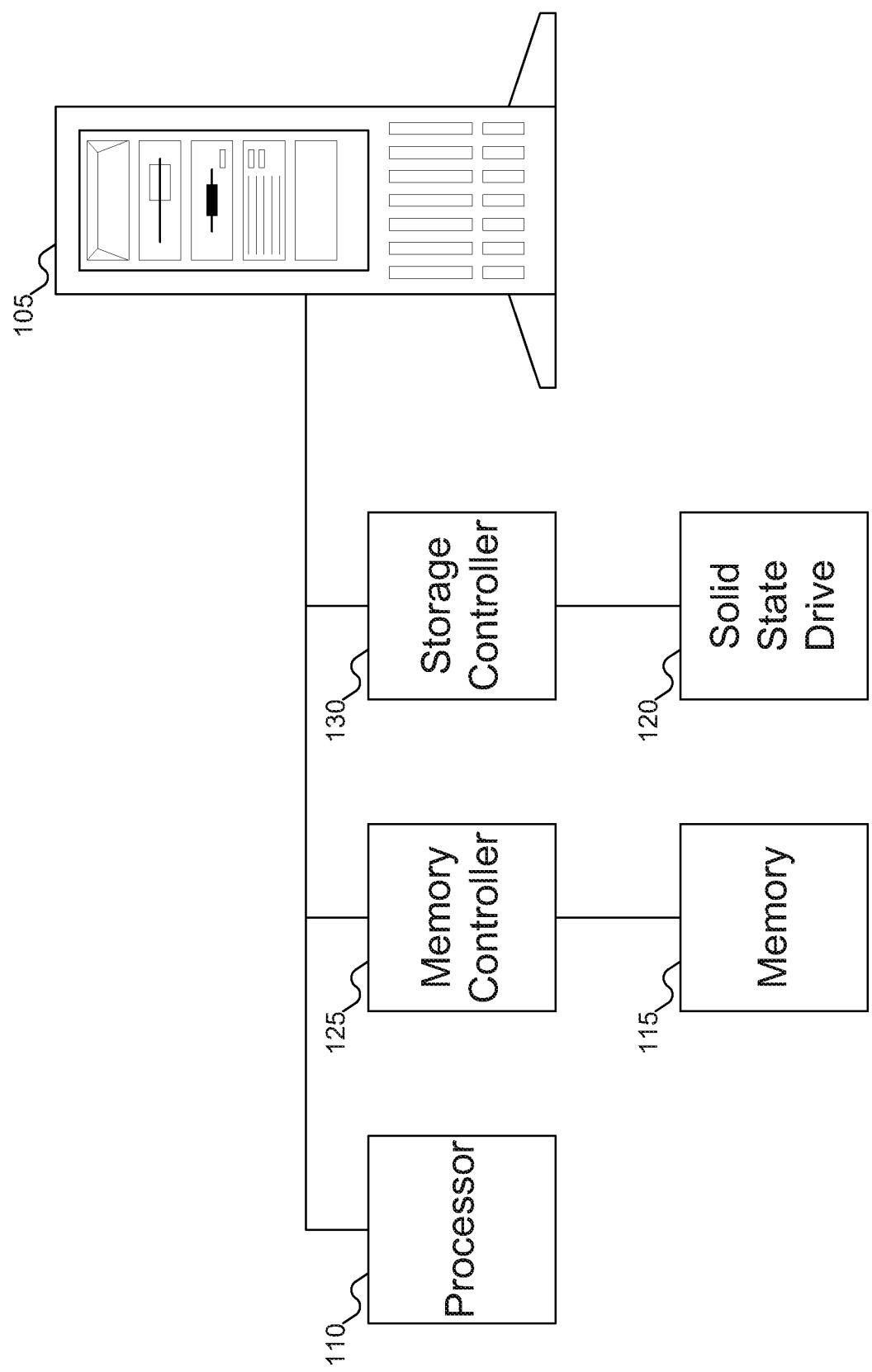
FIG. 1 shows a machine with a Solid State Drive (SSD), according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

With multi-streaming technology, the number of write stream IDs from applications often exceeds the maximum number of streams supported by a Solid State Drive (SSD). To address this problem, the SSD may evaluate the write pattern of each file type/stream ID, and assign actual (device) streams to files/host-streams based on similarities and differences between the host stream characteristics (such as write frequency, accumulated data size, write sequentially, Quality of Service (QoS) requirements, idle time, etc.).

Unlike traditional data sets, stream data flows in and out of a computer system continuously and with varying update rates. It is impossible to store an entire data stream or to scan through it multiple times due to its tremendous data volume. On the other hand, holding the data stream for processing may create a huge bottleneck in the system. Embodiments of the inventive concept may support stream management using a single scan of the streams and on-line.

Input/output (I/O) requests are traditionally managed in one or more queues, either in the host computer system or inside of the firmware of the SSD. Embodiments of the inventive concept may be implemented in either location. In a multi-stream-enabled system, each request in the queue may include an application-assigned stream ID. To translate the application-assigned stream ID to an SSD-supported stream ID, a module may be implemented to monitor a window of requests in the queue(s). The window size may be selected such that the dataset in the window is representative of the distribution of the data generated by the workload(s) on the host machine, or the window size may be set to any desired size. For example, if the SSD processes commands from any number of machines, as may occur in a distributed database, a window size designed to capture the workload on the host machine including the SSD may not be representative of workloads on other machines from which commands arrive. In that case, a different window size may be used to (hopefully) better represent the workload on all the machines sending requests to the SSD. As commands enter the window, statistics—for example, a counter or an accumulated data size for each application-assigned steam ID—may be calculated based on the commands. Once the window is filled, application-assigned stream IDs may be mapped to SSD-supported stream IDs based on the counter values.

For example, assume that the SSD may support n streams. The application-assigned stream IDs with the n−1 largest counter values may be mapped to SSD-supported stream IDs 1 to n−1, respectively. The remaining requests in the window, regardless of application-assigned stream ID, may use the last SSD-supported stream ID (SSD-supported stream ID n).

To handle the dynamic nature of the data requests, the queue window may be managed as a First In, First Out (FIFO or sliding) window. As each request exits the window, the statistics, such as the counter or the accumulated data size corresponding to the associated application-assigned stream ID—may be reduced based on the exiting request. In this manner, the statistics may be maintained only for requests within the window. The application-assigned stream ID to SSD-supported stream ID map may be updated periodically to adapt to the change of data load.

FIG. 1 shows a machine with a Solid State Drive (SSD), according to an embodiment of the inventive concept. In FIG. 1, machine 105 is shown. Machine 105 may be any desired machine, including without limitation a desktop or laptop computer, a server (either a standalone server or a rack server), or any other device that may benefit from embodiments of the inventive concept. Machine 105 may also include specialized portable computing devices, tablet computers, smartphones, and other computing devices. Machine 105 may run any desired application: database applications are a good example, but embodiments of the inventive concept may extend to any desired application.

Machine 105, regardless of its specific form, may include processor 110, memory 115, and Solid State Drive (SSD) 120. Processor 110 may be any variety of processor: for example, an Intel Xeon, Celeron, Itanium, or Atom processor, an AMD Opteron processor, an ARM processor, etc. While FIG. 1 shows a single processor, machine 105 may include any number of processors. Memory 115 may be any variety of memory, such as flash memory, Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc., but is typically DRAM. Memory 115 may also be any desired combination of different memory types. Memory 115 may be controlled by memory controller 125, also part of machine 105.

SSD 120 may be any variety of SSD, and may even be extended to include other types of storage that perform garbage collection (even when not using flash memory). SSD 120 may be controlled by storage controller 130, which may be either integrated into processor 110 or part of machine 105.

Figure 2:
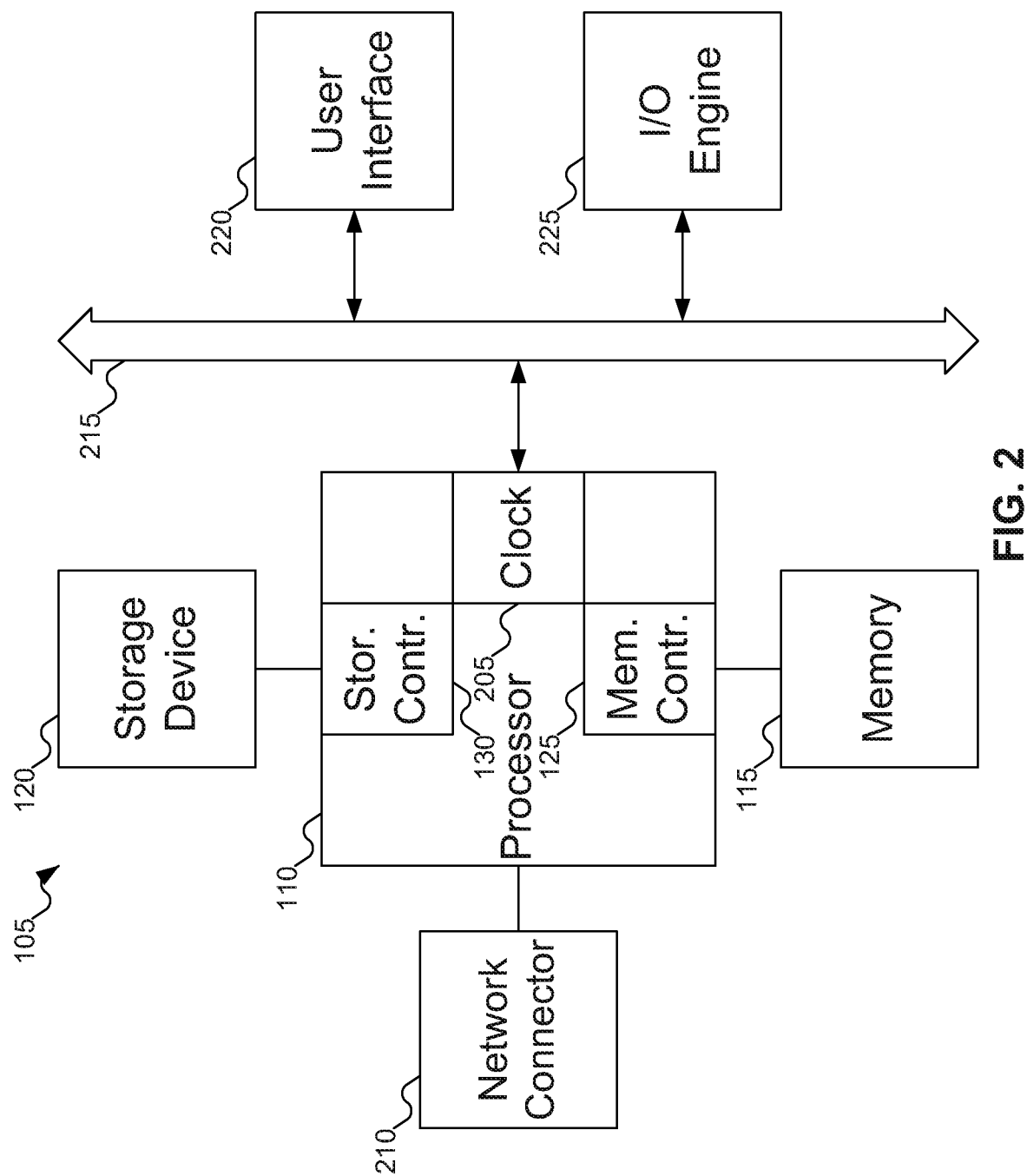
FIG. 2 shows additional details of the machine of FIG. 1.

FIG. 2 shows additional details of the machine of FIG. 1. Referring to FIG. 2, typically, machine 105 includes one or more processors 110, which may include memory controller 125 and clock 205, which may be used to coordinate the operations of the components of machine 105. Processors 110 may also be coupled to memory 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to a bus 215, to which may be attached user interface 220 and Input/Output interface ports that may be managed using Input/Output engine 225, among other components.

Figure 3:
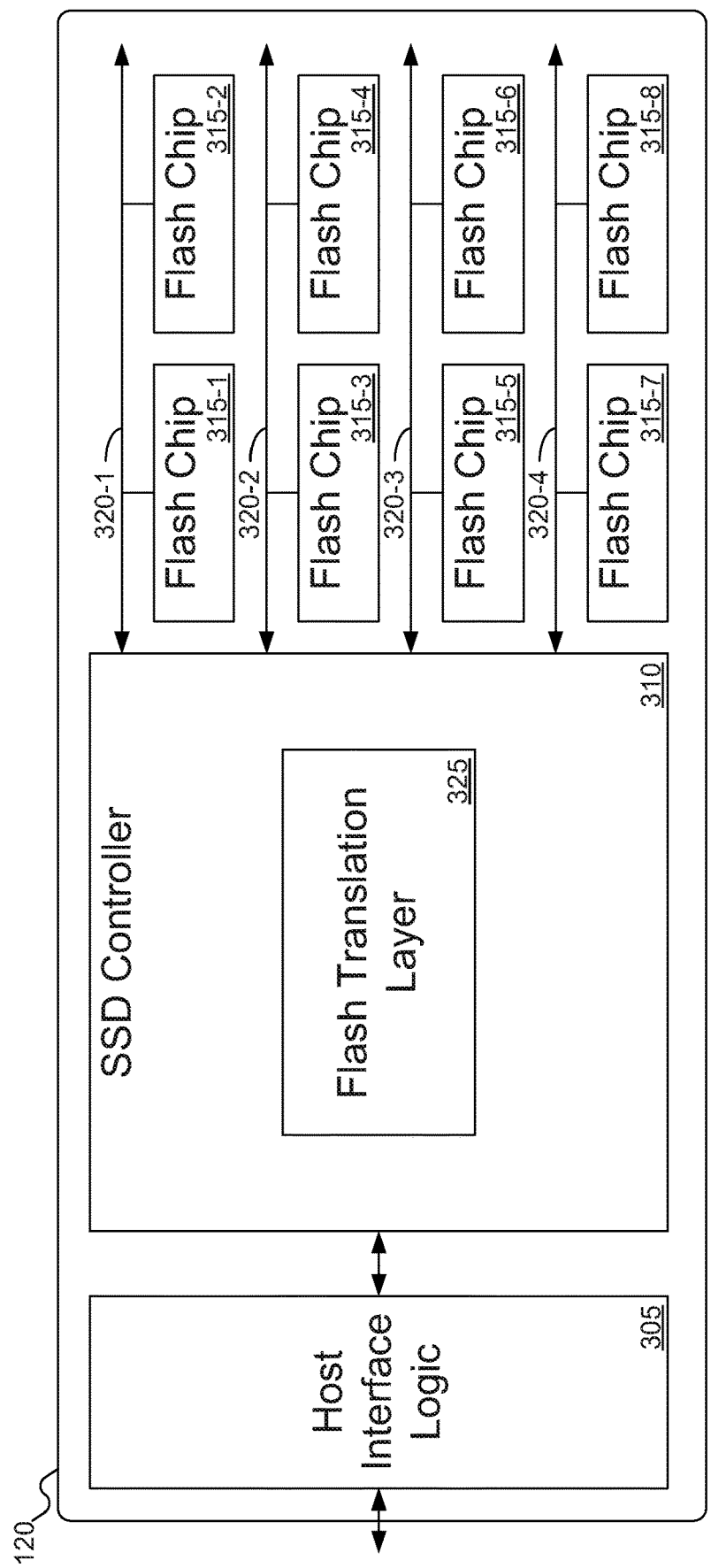
FIG. 3 shows details of the SSD of FIG. 1.

FIG. 3 shows details of SSD 120 of FIG. 1. In FIG. 3, SSD 120 may include host interface logic 305, SSD controller 310, and various flash memory chips 315-1 through 315-8, which may be organized into various channels 320-1 through 320-4. Host interface logic 305 may manage communications between SSD 120 and machine 105 of FIG. 1. SSD controller 310 may manage the read and write operations, along with garbage collection operations, on flash memory chips 315-1 through 315-8. SSD controller 310 may include flash translation layer 325 to perform some of this management.

While FIG. 3 shows SSD 120 as including eight flash memory chips 315-1 through 315-8 organized into four channels 320-1 through 320-4, embodiments of the inventive concept may support any number of flash memory chips organized into any number of channels.

Figure 4:
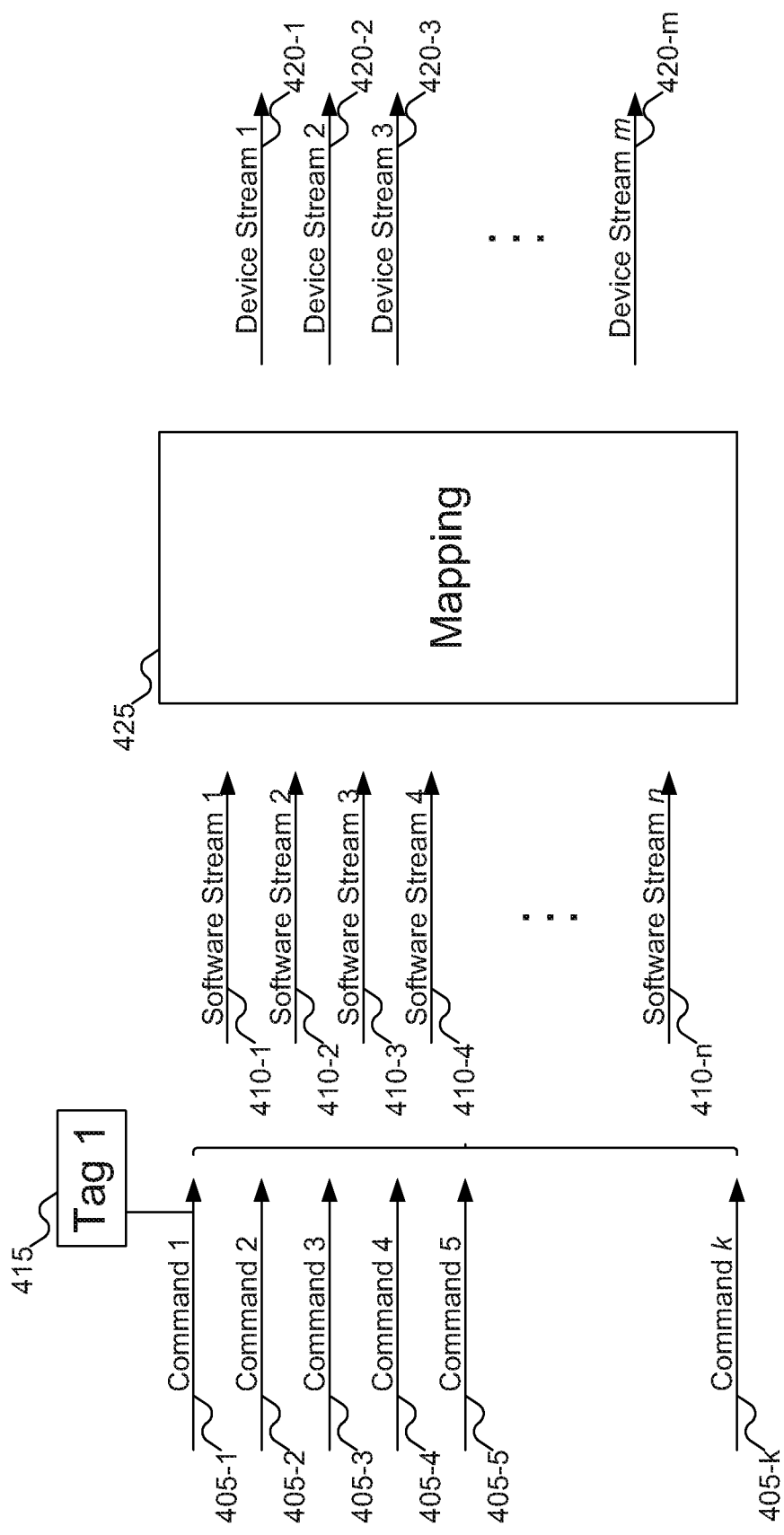
FIG. 4 shows various commands associated with various software streams being mapped to device streams in the SSD of FIG. 1.

FIG. 4 shows various commands associated with various software streams being mapped to device streams in SSD 120 of FIG. 1. In FIG. 4, various commands 405-1 through 405-$k$ are shown. Commands 405-1 through 405-$k$ may originate from any software source on machine 105 of FIG. 1: typical example sources include applications running on machine 105 of FIG. 1 and the operating system running on machine 105 of FIG. 1, but other sources for commands 405-1 through 405-$k$ are possible.

Commands 405-1 through 405-$k$ may be organized into software streams 410-1 through 410-$n$. The term "software streams" is used to distinguish these streams from the streams internal to SSD 120, which are referred to as "device streams"; "software streams" is intended to encompass any possible stream source, including applications and operating systems. Typically, software streams 410 through 410-$n$ are defined by the sources of commands 405-1 through 405-$k$. There is no limit to the number of streams a particular source may open. For example, an application might open a single stream for each file being read from or written to SSD 120 of FIG. 1. Thus, the number of streams n may exceed the number of applications and operating systems issuing commands to SSD 120 of FIG. 1. In the same vein, as an application may issue multiple commands per software stream, the number of commands k may exceed the number of software streams n.

Each command may include tag 415. Tag 415 may specify which software stream 410-1 through 405-*n* the command is associated with. In this manner, each command source (be it application, operating system thread, or some other source) may manage its own commands in the manner that seems most appropriate to the source.

But while the number of software streams n may be limited only by the available memory, the number of device streams 420-1 through 420-*m* is usually limited: that is, SSD 120 of FIG. 1 may support up to a fixed number of device streams, and no more than that predetermined number. If the number of software streams n is no greater than the number of device streams m, then software streams may be assigned in a one-to-one relationship with device streams. But if there are more software streams than device streams (mathematically, if n >m), then a difficulty occurs: at least one device stream needs to handle commands associated with multiple software streams. Mapping 425 may store how software streams 410-1 through 410-*n* are mapped to device streams 420-1 through 420-*m*. But how is mapping 425 produced? FIGS. 5-9B show how mapping 425 may be generated.

Figure 5:
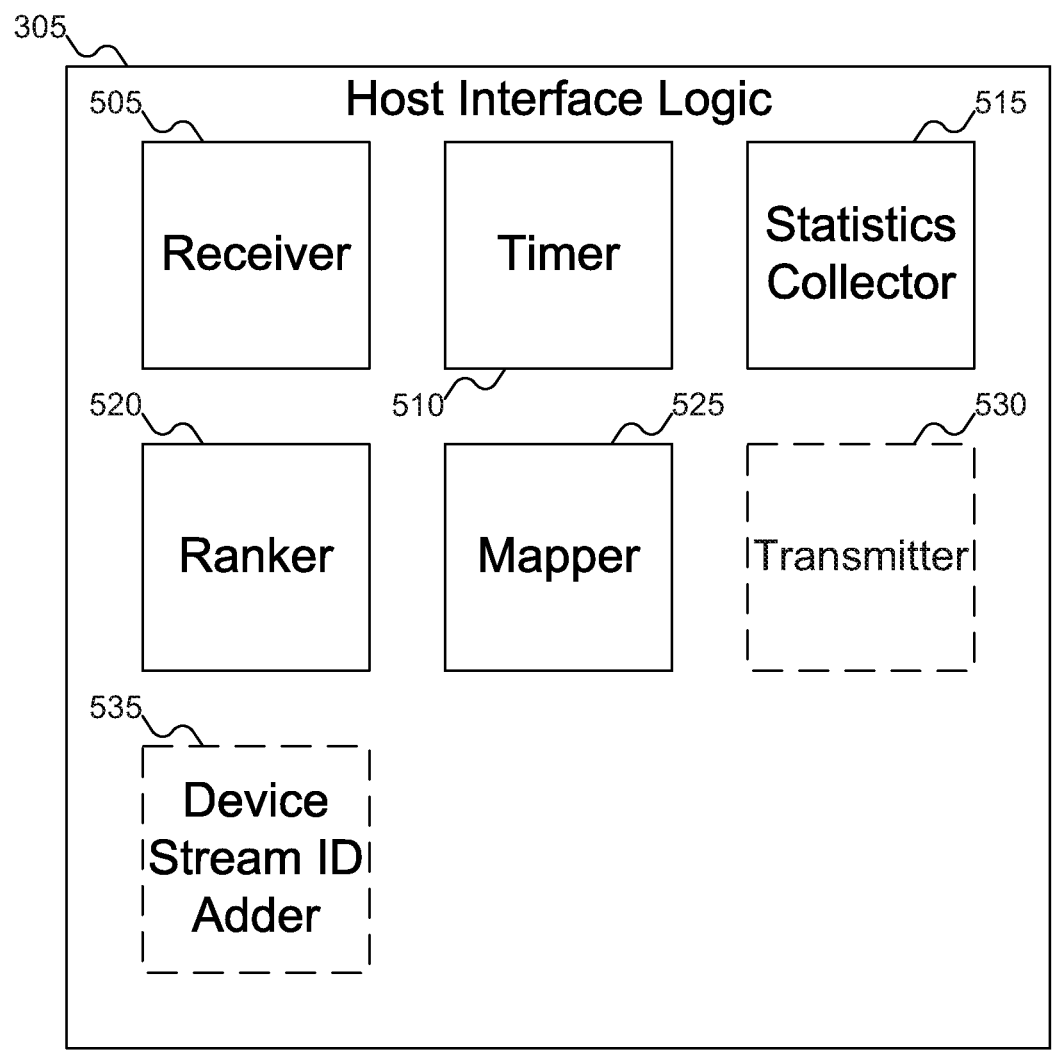
FIG. 5 shows details of the host interface logic of FIG. 3.

FIG. 5 shows details of host interface logic 305 of FIG. 3. In FIG. 5, host interface logic 305 of FIG. 3 is shown as responsible for generating mapping 425 of FIG. 4. But in other embodiments of the inventive concept, the components shown in FIG. 5 may be implemented in software and included as part of, for example, memory controller 125 of FIG. 1, storage controller 130 of FIG. 1, or implemented as library routines that may intercept write requests and combine streams before issuing write commands, or implemented as separate special purpose hardware, either within SSD 120 of FIG. 1 or elsewhere within machine 105. For purposes of this discussion, any reference to the generation of mapping 425 of FIG. 4 is intended to encompass implementation at any specific location, even though the description accompanying FIGS. 5-9B focuses on implementation within host interface logic 305 of FIG. 3.

In FIG. 5, host interface logic 305 may include receiver 505, timer 510, statistics collector 515, ranker 520, and mapper 525. These components may be implemented in either software or hardware, as appropriate for the implementation. For example, for embodiments of the inventive concept that are implemented within host interface logic 305 of FIG. 3, the implementation may include circuitry, whereas for embodiments of the inventive concept implemented within memory controller 125 of FIG. 1 or storage controller 130 of FIG. 1, the implementation may include software.

Receiver 505 may receive commands 405-1 through 405-*k* of FIG. 4 from the various software sources. As a reminder, each command 405-1 through 405-*k* of FIG. 4 may include tag 415 of FIG. 4, which may identify which software stream 410-1 through 410-*n* of FIG. 4 includes the command.

Timer 510 may be used to measure when a window opens and closes. By using a window over an interval of time, statistics collector 515 may calculate statistics regarding streams 410-1 through 410-*n* of FIG. 4 that are representative of the workload on machine 105 of FIG. 1, which may support mapping software streams 410-1 through 410-*n* of FIG. 4 to device streams 420-1 through 420-*m* of FIG. 4.

Figure 6:
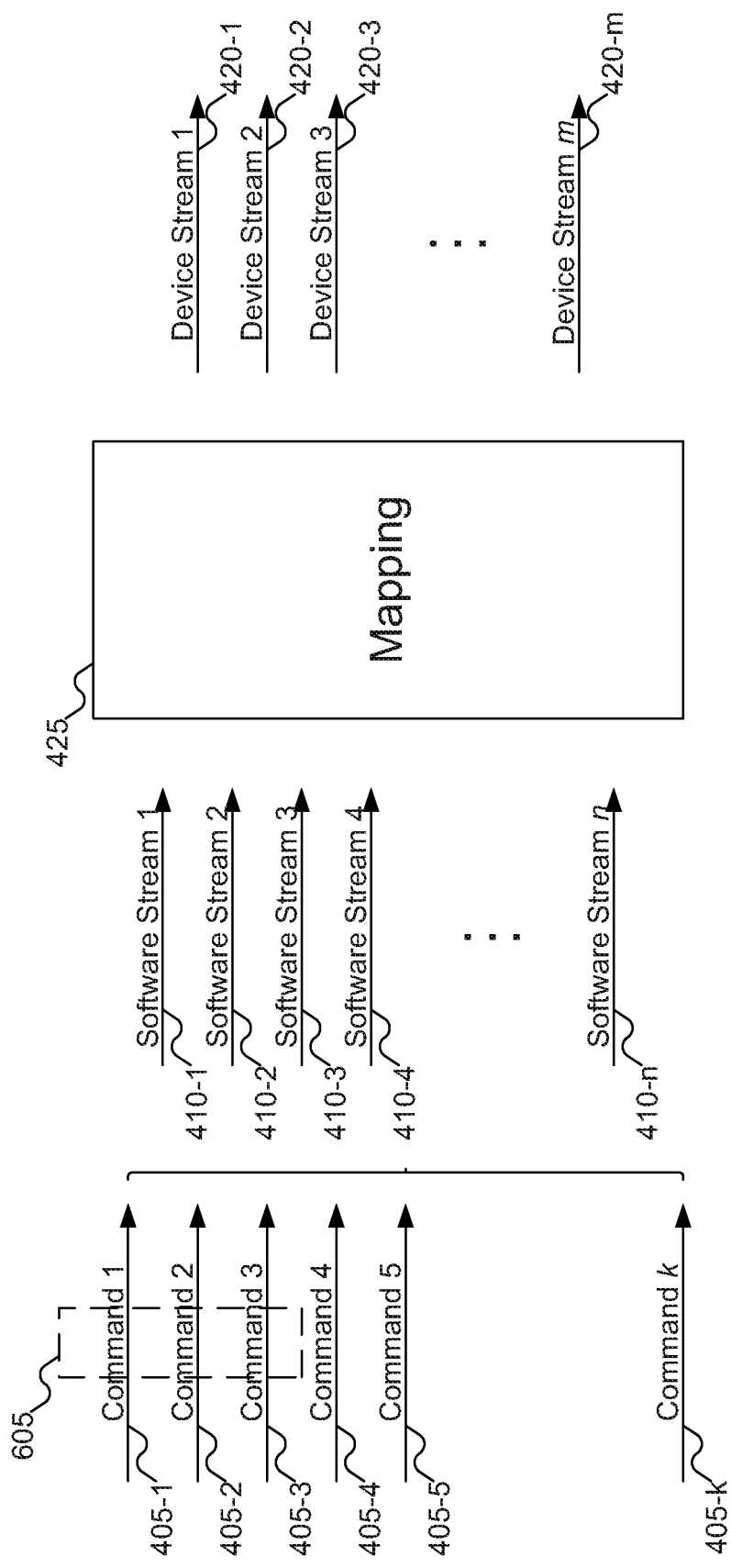
FIG. 6 shows a window being used in calculating statistics for the plurality of commands of FIG. 4, to support mapping the software streams of FIG. 4 to the device streams of FIG. 4 in the SSD of FIG. 1.

FIG. 6 gives an example of such a window. In FIG. 6, window 605 is shown spanning some of commands 405-1 through 405-*k*: specifically, commands 405-1 through 405-3. Based on a statistical analysis of the commands issued during window 605, a representative analysis of the workload on machine 105 of FIG. 1 may (hopefully) be determined. Three commands, as shown in FIG. 6, are not likely to provide a representative sample of the workload on machine 105 of FIG. 1, but embodiments of the inventive concept may support any number of commands within a particular window: FIG. 6 would likely be cluttered to the point of unreadability if window 605 were shown to cover a more reasonable number of commands.

The size of window 605 (as measured by timer 510 of FIG. 5) may vary, depending on the use to which machine 105 of FIG. 1 is put. For example, consider two machines, both with the same average number of commands issued per unit of time, but with widely varying standard deviations. The machine with a small standard deviation in the number of commands would have its commands distributed fairly evenly across time, which means that a smaller window 605 would likely capture a representative sample of commands. On the other hand, the machine with a large standard deviation in the number of commands might have mixed intervals of relatively low activity and high activity. If window 605 were a narrow window and were to capture the periods of relatively low activity, the statistical analysis of those commands might not be representative of the workload on the machine as a whole. Therefore, window 605 would need to be a relatively larger window than the window used on the machine with the small standard deviation in the number of commands.

Window 605 may be either a sliding window or a discrete window. A sliding window is, as the name implies, a window that slides around. Typically, a sliding window covers a fixed interval of time, and moves forward in time as time passes. For example, a sliding window may start at time $T_0$. The sliding window may stay open until time $T_1$. Starting at time $T_1$, the window may move forward so that the window always ends at the current time. As the sliding window moves forward, new information may enter the window, and information at the start of the sliding window (that is, information closest to time $T_0$) may exit the window.

A discrete window, on the other hand, covers a fixed interval in time, and does not move. For example, a discrete window might collect statistics over the interval from time $T_0$ to time $T_1$; once time $T_1$ is reached, collection of statistics for that window ends (although a new window might begin at any time, such as time $T_1$).

Figure 7:
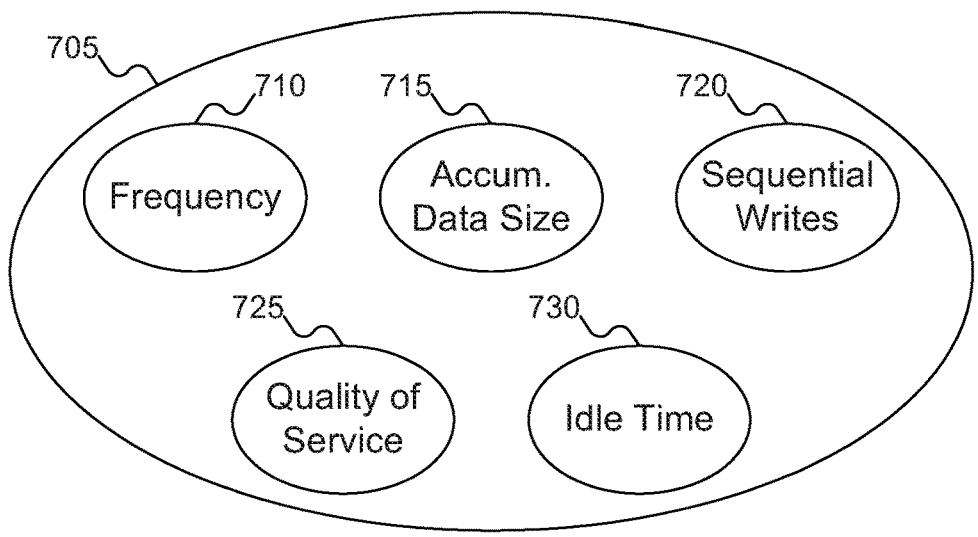
FIG. 7 shows various criteria that may be used in generating the mapping of FIG. 3.

Statistics collector 515 may collect statistics on any desired criterion or criteria. Example criteria are shown in FIG. 7. Examples of criteria 705 may include:

Frequency 710: how many commands (reads, writes, or both) associated with a particular software stream were issued during window 605 of FIG. 6. A software stream with a higher number of commands would have a higher rank than a software stream with a lower number of commands.

Accumulated data size 715: how much data was written for a particular software stream during window 605 of FIG. 6. A software stream with a larger accumulated data size would have a higher rank than a software stream with a smaller accumulated data size.

Number of sequential writes 720: how many writes to sequential (or sequentially patterned) logical block addresses (LBAs) occurred within a particular software stream during window 605 of FIG. 6. A software stream with a higher number of sequential writes would have a higher rank than a software stream with a lower number of sequential writes.

Quality of Service 725: whether a particular software stream has requested a specific quality of service (which might give that software stream priority over other software streams). Examples of different Quality of Service characteristics may be found in U.S. patent application Ser. No. 15/167,974, filed May 27, 2016, which claims the benefit of U.S. Provisional Patent Application Ser. No. 62/309,446, filed Mar. 16, 2016, both of which are incorporated by reference herein for all purposes. A software stream with a greater Quality of Service requirement would have a higher rank than a software stream with a lower Quality of Service requirement.

Idle time 730: how long does it take between commands for a particular software stream. A software stream with a shorter idle time would have a higher rank than a software stream with a longer idle time.

Statistics collector 515 of FIG. 5 may collect statistics in any desired manner. For example, when window 605 of FIG. 6 is a discrete window, statistics collector 515 of FIG. 5 may reset all statistics to zero at the start of window 605 of FIG. 6. Then, as commands are encountered that trigger changes in the statistics for a stream, statistics collector 515 of FIG. 6 may adjust the statistics as appropriate.

For example, consider using frequency 710 as a criterion. Whenever a command is received, statistics collector 515 of FIG. 5 may determine what software stream that command is associated with. Statistics collector 515 of FIG. 5 may then increment a frequency counter (a value) for that software stream. Statistics collector 515 of FIG. 5 may collect similar values for the other criteria: summing the amount of data written for accumulated data size 715, counting the number of sequential writes for number of sequential writes 720, assigning a value to represent a particular Quality of Service for Quality of Service 725, or summing the amount of time during which a particular software stream has no pending commands for idle time 730.

On the other hand, if window 605 of FIG. 6 is a sliding window, statistics collector 515 of FIG. 5 may adjust the statistics as commands enter and exit window 605 of FIG. 6. Again using frequency 710 as an example, when commands associated with a particular software stream enter window 605 of FIG. 6, statistics collector 515 of FIG. 5 may increment the counter associated with that software stream, and when commands associated with a particular software stream exit window 605 of FIG. 6, statistics collector 515 of FIG. 5 may decrement the counter associated with that software stream. In that manner, the statistics collected by statistics collector 515 of FIG. 5 may always be representative of the commands in window 605 of FIG. 6. Statistics collector 515 of FIG. 5 may operate similarly for the other criteria.

In some embodiments of the inventive concept, when window 605 is a discrete window, mapping 425 may be established using the statistics available to date for window 605, even if window 605 is still open (and therefore not all of commands 405-1 through 405-k have been processed for statistical purposes). But in other embodiments of the inventive concept, statistics generated during one window are actually used to establish mapping 425 for a time period after windows 605 closes. Thus, if window 605 is used to collect statistics during a span of time from time $T_0$ to time $T_1$, those statistics may be used to establish mapping 425 for commands 405-1 through 405-k received after time $T_1$. If discrete window 605 is a repeating discrete window—that is, window 605 has a fixed size and when one window is closed another window is automatically opened—then the statistics collected in each window are used to establish mapping 425 for the next window. So, for example, the statistics collected between time $T_0$ and time $T_1$ may be used to generate mapping 425 between time $T_1$ and time $T_2$, statistics collected between time $T_1$ and time $T_2$ may be used to generate mapping 425 between time $T_2$ and time $T_3$, and so on.

In other embodiments of the inventive concept, when window 605 is a discrete window, statistics collector 515 of FIG. 5 operates to collect statistics only when instructed by machine 105 of a user of machine 105. That is, window 605 may be opened manually for new statistics collection. Once new statistics are collected, mapping 425 may be generated, after which mapping 425 is retained indefinitely until host interface logic 305 of FIG. 3 receives an instruction to generate a new mapping 425, after which a new window 605 is opened and statistics collector 515 of FIG. 5 collects new statistics based on commands received during new window 605.

When window 605 is a sliding window, mapping 425 may be adjusted on any desired schedule. For example, mapping 425 might be changed every time the statistics collected by statistics collector 515 of FIG. 5 change. For example, every time a command enters window 605, frequency 710 of FIG. 7 for the corresponding application-assigned stream ID may be incremented, and every time a command exits window 605, frequency 710 of FIG. 7 for the corresponding application-assigned stream ID may be decremented. Or, mapping 425 might be adjusted at certain intervals (for example, at time $T_1$ or multiples thereof). Embodiments of the inventive concept may support updating mapping 425 according to any other desired schedule.

Regardless of whether window 605 is a sliding window or a discrete window, a question might arise about how to handle mapping software streams 410-1 through 410-n to device streams 420-1 through 420-m during initial window 605. During initial window 605, when no statistics have previously been collected, any mapping may be used (since it is unlikely that any predetermined mapping would be best in all situations). But once statistics collector 515 of FIG. 5 has collected some statistics, it is possible to generate mapping 425 for future commands.

Returning to FIG. 5, once statistics have been collected for window 605, ranker 520 may use those statistics to rank software streams 410-1 through 410-n of FIG. 4. Typically, a lower value would result in a higher rank, but embodiments of the inventive concept may support a higher value indicating a higher rank. For a given criterion, the application-assigned stream IDs may be assigned a rank according to the sorted position of their value for that criterion. For example, if frequency 705 is used as the criterion, the application-assigned stream ID with the highest frequency may be assigned rank 1, the application-assigned stream ID with the second highest frequency may be assigned rank 2, and so on down to the application-assigned stream ID with the lowest frequency. Ranks are discussed further with reference to Tables 1-2 below. Once software streams 410-1 through 410-n of FIG. 4 have been ranked, mapper 525 may map software streams 410-1 through 410-n of FIG. 4 to device streams 420-1 through 420-m.

Mapper 525 may create mapping 425 of FIG. 4 by dividing software streams 410-1 through 410-n of FIG. 4 into two subsets. The software streams in the first subset may be assigned to device streams in a one-to-one mapping; the software streams in the second subset may all be assigned to a single consolidated device stream. In other words, the software streams in the first subset get assigned unique device streams, whereas the software streams in the second subset all share a single device stream. Since all the software streams in the second subset share a single device stream, this means that the first subset may include up to m−1 software streams, where m is the number of device streams 420-1 through 420-m of FIG. 4 supported by SSD 120 of FIG. 1.

The subsets of software streams 410-1 through 410-n of FIG. 4 may be determined based on the ranks for software streams 410-1 through 410-n of FIG. 4 as determined by ranker 520. For example, assuming that there are m device streams 420-1 through 420-m of FIG. 4 supported by SSD 120 of FIG. 1, the m−1 highest ranking software streams (as ranked according to the chosen criterion/criteria) may be included in the first subset, and all the lower ranking software streams may be included in the second subset. This allocation results in the software streams with the highest ranks each being assigned a unique device stream, and all the lowest ranking software streams sharing a consolidated device stream.

Where m−1 specific software streams may not be identified to be included in the first subset (for example, if there is a tie for rank m−1), any desired resolution may be used to select the final software streams for the first subset (since the choices all have equal rank). For example, assume that there are m software streams all tied for the highest rank (a possible, if unlikely, scenario). Since the m software streams are all of equal rank, any m−1 of the m software streams may be selected for the first subset, with the one unselected stream becoming part of the second subset (and therefore relegated to sharing the consolidated device stream).

If all device streams are equivalent, then it makes no difference which device stream is used as a consolidated stream for the software streams in the second subset, or how the m−1 software streams in the first subset are mapped to m−1 device streams. But if device streams are differentiable, then the mapping may matter. For example, the highest priority device stream might be used as the consolidated device stream (since that device stream is shared across any number of software streams), and the remaining device streams may be assigned to the software streams in the first subset according to their ranking based on the criterion used (the highest ranked software stream receiving the highest priority device stream available, the second highest ranked software stream receiving the second highest priority device stream available, and so on). Or, since the consolidated device stream is shared among any number of software streams with low ranks according to the criterion, the consolidated device stream may be selected as the lowest priority device stream available, with the software streams in the first subset being mapped to the highest priority device streams according to the software streams' ranks according to the criterion. Embodiments of the inventive concept can support any desired mapping technique from software streams to device streams.

While the above description suggests that only one device stream operates as a consolidated device stream, other embodiments of the inventive concept are possible. For example, there may be multiple device streams used as consolidated device streams. Such an embodiment of the inventive concept may be useful where the number of software streams 410-1 through 410-n of FIG. 4 greatly exceeds the number of device streams 420-1 through 420-m of FIG. 4: consolidating most of software streams 410-1 through 410-n of FIG. 4 into a single consolidated device stream might result in poor performance for all of those software streams. By using multiple consolidated device streams, performance of the software streams that are consolidated may be enhanced (but at the cost of reducing the number of software streams that may be assigned unique device streams).

How many device streams are used as consolidated device streams may be determined using any desired mechanism. For example, when using frequency 710 of FIG. 7 as a criterion, an upper limit might be set on the number of software streams to be assigned to a single consolidated device stream. If the number of software streams in the second subset is greater than this upper limit, then additional device streams may be used as consolidated device streams: as many as are needed to keep the number of software streams assigned to any consolidated device stream below this upper limit. The same concept may be applied using other criteria 705 of FIG. 7. For example, when using accumulated data size 715 of FIG. 7 as a criterion, an upper limit on the amount of accumulated data to be written using a single consolidated device stream may be assigned. Or, when using Quality of Service 725 of FIG. 7 as a criterion, a maximum total latency may be set for any consolidated device stream (based, for example, on the duration of window 605 of FIG. 6). If the total number of commands assigned to a consolidated device stream would mean that the total latency for the consolidated data stream is greater than this maximum total latency, an additional consolidated data stream may be used.

In addition, any desired device stream may be selected for use as a consolidated device stream. For example, since a consolidated device stream may process commands associated with any number of software sources, it is reasonable to expect that a consolidated device stream will have more commands than other device streams that process commands associated with a single software stream. Thus, it may be advantageous to select a device stream that has a higher priority as a consolidated device stream (to compensate for the fact that the consolidated device stream may be relatively slower in processing commands than device streams processing commands associated with only one software stream). This selection may be especially advantageous when streams offer QoS guarantees (although QoS might not be the only reason to select a higher priority device stream as a consolidated device stream).

It is also possible to mix criteria. For example, although the criteria used to rank streams for mapping 425 of FIG. 4 might use idle time 730, the criteria used to determine how many consolidated device streams to use might be a maximum number of commands assigned to the consolidated device stream during window 605. Embodiments of the inventive concept may support the use of any criteria to determine how many consolidated device streams to use. (It is also possible to use multiple criteria in ranking software streams 410-1 through 410-n, as described below with reference to FIGS. 8-9B below).

As mentioned above, embodiments of the inventive concept may be implemented within host interface logic 305 of FIG. 3. In such embodiments of the inventive concept, the implementation is within SSD 120 of FIG. 1. Since SSD 120 may directly manage mapping 425 of FIG. 4, there is no difficulty in knowing to which device stream a particular software stream should be assigned. In such embodiments of the inventive concept, transmitter 530 and device stream identifier (ID) adder 535 are not needed. (Technically, host interface logic 305 may include transmitter 530 to transmit information back to the application or operating system thread that requested the data, but transmitter 530 would operate as a conventional transmitter within SSD 120 of FIG. 1.)

But when embodiments of the inventive concept are implemented in memory controller 125 of FIG. 1, storage controller 130 of FIG. 1, or as library routines, SSD 120 of FIG. 1 does not necessarily have access to mapping 425 of FIG. 4. In some embodiments of the inventive concept, transmitter 530 may transmit mapping 425 of FIG. 4, so that SSD 120 of FIG. 1 may perform the mapping as determined by mapper 525. But instead of sending mapping 425 of FIG. 4 to SSD 120 of FIG. 1, other embodiments of the inventive concept may inform SSD 120 of FIG. 1 to which device stream a particular command should be assigned by using device stream ID adder 535. Device stream ID adder 535 may include an additional tag, similar to tag 415 of FIG. 4, that specifies the associated device stream 420-1 through 420-m of FIG. 4. In that manner, SSD 120 of FIG. 1 may know which device stream 420-1 through 420-m of FIG. 4 to use for processing a particular command.

Regardless of where embodiments of the inventive concept are implemented, mapping 425 of FIG. 4 may either be automatically or manually regenerated. For example, mapping 425 of FIG. 4 may be updated as commands enter and exit window 605 of FIG. 6, which affects the statistics on software streams 410-1 through 410-n, which in turn may trigger automatic regeneration of mapping 425 of FIG. 4. Or, if window 605 of FIG. 6 is a discrete window that is used at regular intervals, whenever discrete window 605 of FIG. 6 closes mapping 425 of FIG. 4 may be automatically regenerated to reflect the new statistics collected by statistics collector 515.

On the other hand, mapping 425 of FIG. 4 may be retained until manual regeneration is triggered. To achieve manual regeneration, host interface logic 305 of FIG. 3, memory controller 125 of FIG. 1, storage controller 130 of FIG. 1, or as library routines may include support to receive commands to trigger manual regeneration, to clear statistics, and to collect new statistics. Support to process these commands may be implemented in firmware (not shown in host interface logic 305 of FIG. 3) or in software (in memory controller 125 of FIG. 1, storage controller 130 of FIG. 1, or library routines).

Figure 8:
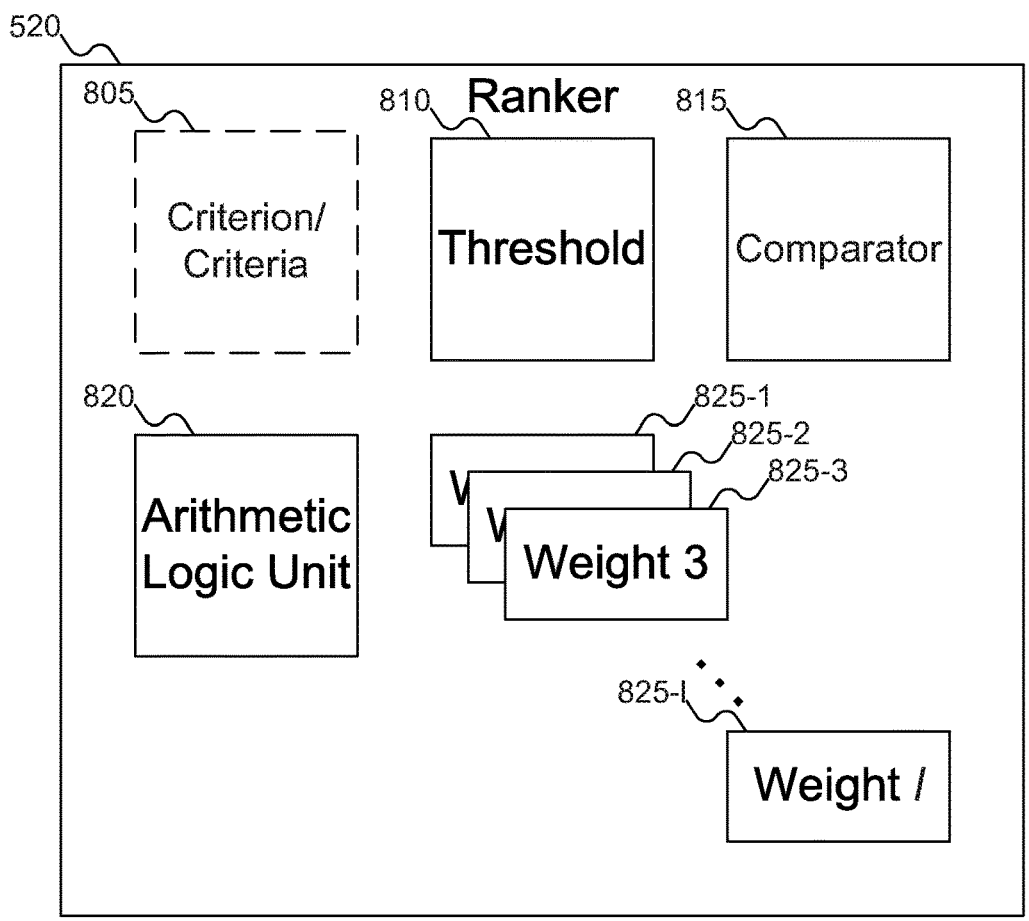
FIG. 8 shows details of the ranker of FIG. 5.

FIG. 8 shows details of ranker 520 of FIG. 5. As described above, ranker 520 may rank software streams 410-1 through 410-n based on a selected criterion or criteria. In FIG. 8, ranker 520 is shown as including criteria 805, threshold 810, and comparator 815. Criteria 805 may identify the criteria to be used in ranking the software streams. If statistics collector 515 of FIG. 5 only collects statistics for a single criterion, then ranker 520 might not need to know which criterion was used, in which case criteria 805 may be omitted, which is why criteria 805 is shown with a dashed line. But even if statistics collector 515 of FIG. 5 only collects statistics for a single criterion, ranker 520 might need to know which criterion was used, as this information may affect rank order. For example, frequency 710 of FIG. 7 would suggest a higher rank for software streams with corresponding higher frequencies; but idle time 730 of FIG. 7 would suggest a higher rank for software streams with corresponding smaller idle times.

If ranker 520 operates using only a single criterion, then all ranker 520 needs to do is place software streams 410-1 through 410-n of FIG. 4 in order depending on the values for the criterion corresponding to each software stream. But ranker 520 may use more than one criterion in ranking software streams 410-1 through 410-n of FIG. 4.

In one embodiment of the inventive concept, ranker 520 may use two (or more) criteria to rank software streams 410-1 through 410-n of FIG. 4. In this embodiment of the inventive concept, ranker 520 may include threshold 810 and comparator 815. One criterion may be used when the values exceed threshold 810; the other criterion may be used when the values for the first criterion do not exceed threshold 810. Comparator 815 may be used to determine which criteria to use in ranking the software streams.

Figure 9A:
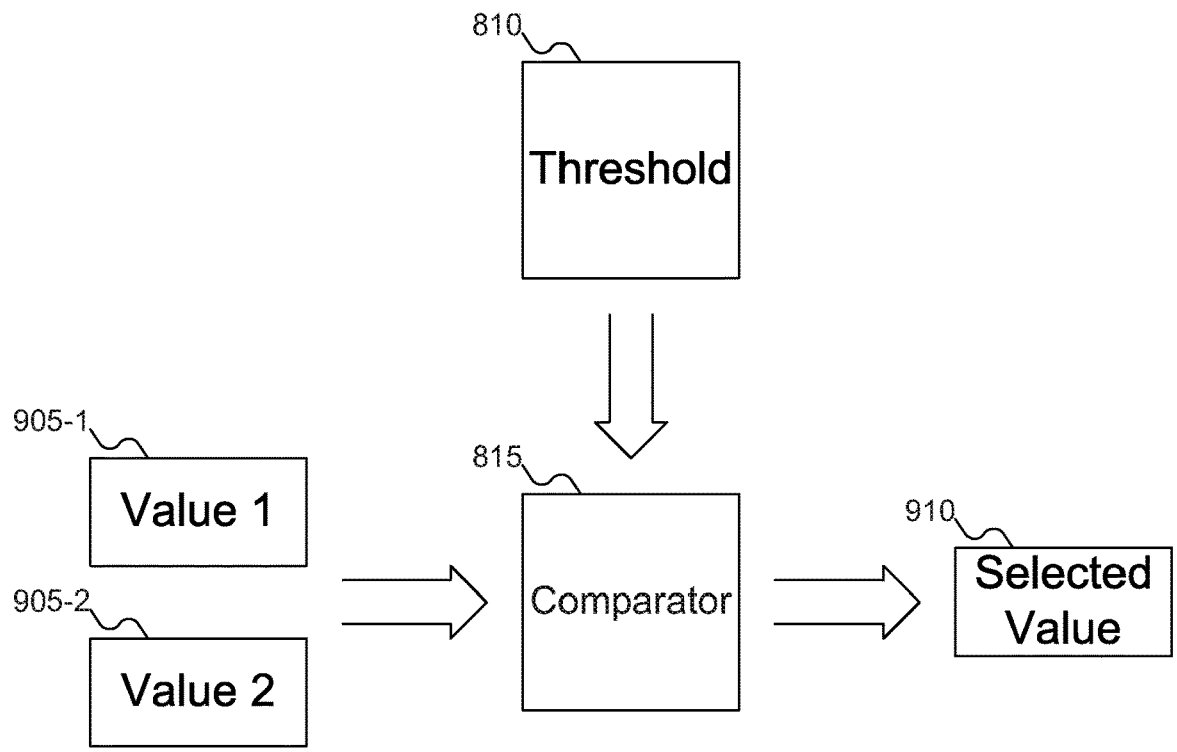
FIGS. 9A-9B show different ways for the ranker of FIG. 5 to rank software streams, according to embodiments of the inventive concept.

FIG. 9A illustrates this process. In FIG. 9A, comparator 815 may receive threshold 810 and values 905-1 and 905-2 for the two criteria being used to rank software streams 410-1 through 410-n of FIG. 4. Comparator 815 may then compare threshold 810 with value 905-1 (arbitrarily selected here as the value for the criterion associated with threshold 810). If value 905-1 is greater than threshold 810, then comparator 815 may select value 905-1 (as selected value 910) to use in ranking software streams 410-1 through 410-n of FIG. 4.

An example might help to illustrate the operation of ranker 520 of FIG. 5 in this scenario. Assume that the first criterion selected is accumulated data size 715 of FIG. 7, and the second criteria is frequency 710 of FIG. 7. Further assume that software streams 410-1 through 410-n of FIG. 4 result in the statistics for these criteria shown in Table 1 below.

TABLE 1

| Software Stream | Accumulated Data Size | Frequency |
| --- | --- | --- |
| 1 | 1.0 GB | 30 |
| 2 | 0.75 MB | 5 |
| 3 | 0.65 MB | 6 |
| 4 | 1.2 GB | 4 |

If threshold 815 is set to 1 MB, then the four software streams would be ranked in the following order: 4, 1, 3, and 2. Software streams 1 and 4 each have accumulated data sizes that exceed 1 MB, and software stream 4 has a greater accumulated data size (the fact that software stream 1 has more associated commands than software stream 4 is not relevant). On the other hand, software streams 2 and 3 have accumulated data sizes that are less than 1 MB, so these streams are ranked based on their frequency: software stream 3, despite writing the smallest accumulated data, had more associated commands, and so is ranked higher than software stream 2.

While the above discussion centers around using two criteria, embodiments of the inventive concept may support using any number of criteria in determining the final rank of the software streams. That is, a first criterion may be used to rank software streams whose values for that criterion exceed a first threshold, then a second criterion may be used to rank the remaining software streams (i.e., those software streams whose value for the first criterion did not exceed the first threshold) if their values for the second criterion is greater than a second threshold, and so on. Additionally, while this description centers on software streams with values exceeding a particular threshold, embodiments of the inventive concept may support using one or more thresholds as an upper bound (rather than a lower bound) for ranking purposes. For example, idle time 730 of FIG. 7 might be used as the ranking criterion if the idle time is, say, less than 100 ms, with frequency 710 of FIG. 7 being used as the ranking criterion for the software streams whose idle time is at least 100 ms.

Returning to FIG. 8, in another embodiment of the inventive concept, ranker 520 may use multiple criteria by performing a weighted sum. In this embodiment of the inventive concept, ranker 520 may include arithmetic logic unit (ALU) 820 and weights 825-1 through 825-$l$. Weights 825-1 through 825-$l$ may represent the weights to be applied to each separate criteria included in the weighted sum, and ALU 820 may perform the arithmetic necessary to calculate the weighted sum. In other words, weights 825-1 through 825-$l$ may indicate the relative importance of the criteria being used in calculating the weighted sum. When a lower rank indicates higher importance, weights 825-1 through 825-$l$ may similarly use smaller values to indicate higher importance for that criterion in the weighted sum.

To calculate the weighted sum, ranker 520 may first rank software streams 410-1 through 410-$n$ of FIG. 4 according to each criterion separately. Then the weights may be multiplied by the ranks of each software stream to produce the final weighted sum. Note that since lower numbers indicate higher rank (rank 1 being the highest rank), smaller weights should be used to indicate the more important criteria. It is helpful (but not required) for weights 825-1 through 825-$l$ to sum to 1.0. Note that ranking software streams 410-1 through 410-$n$ of FIG. 4 according to a single criterion is equivalent to ranking software streams 410-1 through 410-$n$ of FIG. 4 according to multiple criteria, but where only one of weights 825-1 through 825-$l$ has a positive non-zero value and all other weights 825-1 through 825-$l$ have a zero value. Note that the weighted sum might not result in integer results: this result is acceptable, since the results of the weighted sums are then ranked again to produce the final ranking for software streams 410-1 through 410-$n$ of FIG. 4.

Figure 9B:
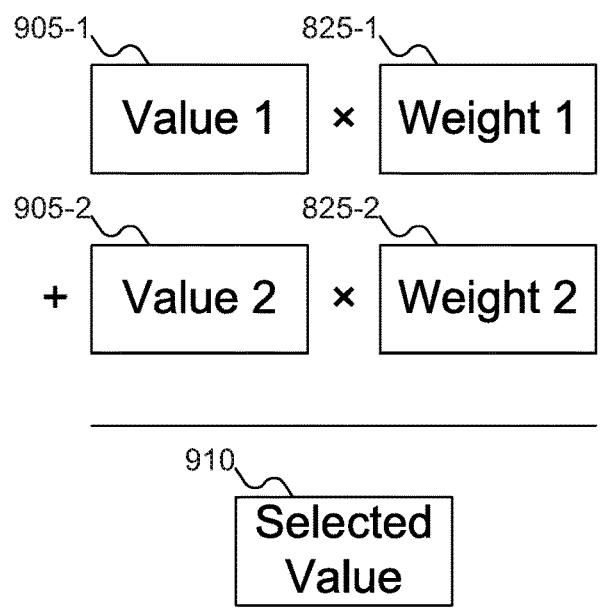

FIG. 9B illustrates this process. In FIG. 9B, ALU 820 of FIG. 8 may receive values 905-1 and 905-2 for the two criteria being used to rank software streams 410-1 through 410-$n$ of FIG. 4, along with weights 825-1 and 825-2. ALU 820 of FIG. 8 may then compute selected value 910 as the product of value 905-1 and weight 825-1, added to the product of value 905-2 and weight 910-2 threshold 810 with value 905-1. Selected value 910 then becomes the value used in ranking software streams 410-1 through 410-$n$ of FIG. 4.

Again, an example might help to illustrate the operation of ranker 520 of FIG. 5 in this scenario. Assume that the first criterion selected is accumulated data size 715 of FIG. 7, and the second criteria is frequency 710 of FIG. 7. Further assume that software streams 410-1 through 410-$n$ of FIG. 4 result in the statistics for these criteria shown in Table 2 below.

TABLE 2

| Software Stream | Accumulated Data Size | Frequency | Rank 1 | Rank 2 |
|---|---|---|---|---|
| 1 | 1.0 GB | 30 | 2 | 1 |
| 2 | 0.75 MB | 5 | 3 | 3 |
| 3 | 0.65 MB | 6 | 4 | 2 |
| 4 | 1.2 GB | 4 | 1 | 4 |

To simplify things, in Table 2 the ranks for the four software streams, relative to their accumulated data size and frequency respectively, are shown.

Note that if the weight associated with accumulated data size 715 of FIG. 7 were set to 1 and the weight associated with frequency 710 of FIG. 7 were set to 0, then the ranks would be as shown in the column labeled Rank 1; if these weights were interchanged, then the ranks would be as shown in the column labeled Rank 2.

Now, assume that accumulated data size was considered to be 3 times as important as frequency. The resulting weights could then be 0.25 for accumulated data size and 0.75 for frequency (recall that since lower numbers mean higher ranks, smaller values for weights mean greater significance). The weighted sums of the ranks for the software streams would be, respectively, 1.25, 3, 2.5, and 3.25, which would mean that the software streams would be ranked in the following order: 1, 3, 2, and 4. Note that this is the same ranking as the column labeled Rank 2, but this fact is coincidence.

FIGS. 8-9B explain how to perform a ranking using two criteria. Embodiments of the inventive concept may support using more than two criteria by a simple generalization of the processes shown. For example, three or more of weights 825-1 through 825-$l$ of FIG. 8 may be given non-zero values, or multiple thresholds 810 of FIG. 8 may be set for determining which criterion to use when ranking software streams 410-1 through 410-$n$ of FIG. 4.

Figure 10A:
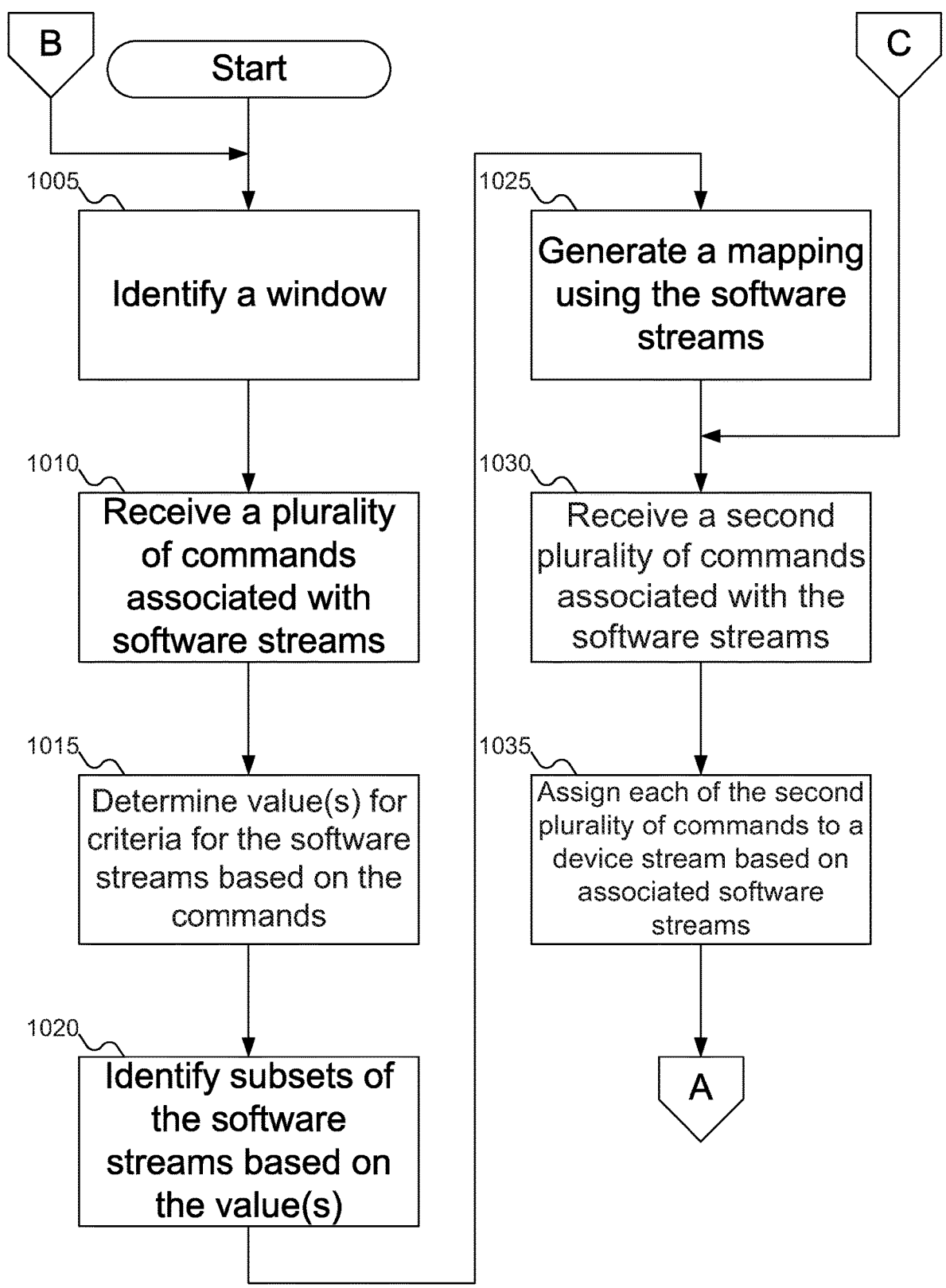
FIGS. 10A-10B show a flowchart of an example procedure for generating the mapping of FIG. 4, according to an embodiment of the inventive concept.
Figure 10B:
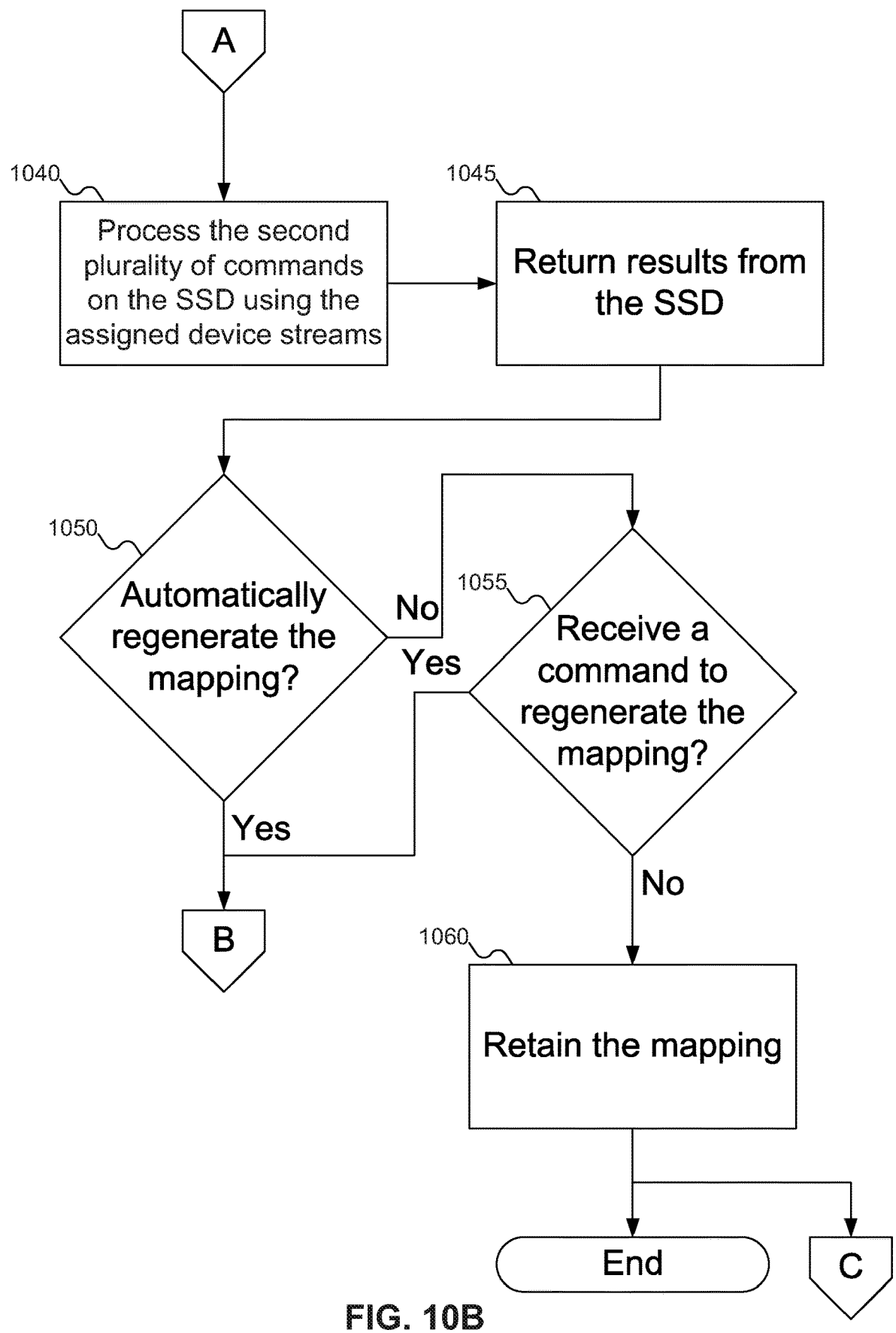

FIGS. 10A-10B show a flowchart of an example procedure for generating mapping 425 of FIG. 4, according to an embodiment of the inventive concept. In FIG. 10A, at block 1005, host interface logic 305 of FIG. 3 may identify window 605 of FIG. 6 to use to collect statistics regarding software streams 410-1 through 410-$n$ of FIG. 4. (In FIGS. 10A-13 below, any reference to host interface logic 305 of FIG. 3 may be replaced by a reference to memory controller 125 of FIG. 1 or storage controller 130 of FIG. 1, depending on where embodiments of the inventive concept are implemented). At block 1010, host interface logic 305 may receive the plurality of commands 405-1 through 405-$k$ of FIG. 4, some of which may be received when window 605 of FIG. 6 is open. At block 1015, statistics collector 515 may determine values for criteria 705 of FIG. 7 based on the plurality of commands 405-1 through 405-$k$ of FIG. 4 (at least, those commands received when window 605 of FIG. 6 is open).

At block 1020, ranker 520 of FIG. 5 may identify subsets of software streams 410-1 through 410-$n$ of FIG. 4 based on the values determined by statistics collector 515 of FIG. 5. At block 1025, mapper 525 of FIG. 5 may generate mapping 425 of FIG. 4, mapping software streams 410-1 through 410-$n$ of FIG. 4 to device streams 420-1 through 420-$m$ of FIG. 4.

At block 1030, host interface logic 305 of FIG. 3 may receive additional commands 405-1 through 405-$k$ of FIG. 4. At block 1035, mapper 525 of FIG. 5 may assign each of those additional commands 405-1 through 405-$k$ of FIG. 4 to device streams 420-1 through 420-$m$ of FIG. 4 using mapping 425 of FIG. 4.

At block 1040 (FIG. 10B), SSD 120 of FIG. 1 may process the additional commands 405-1 through 405-$k$ of FIG. 4 using the assigned device streams 420-1 through 420-$m$ of FIG. 4. At block 1045, SSD 120 of FIG. 1 may return results of processing these additional commands 405-1 through 405-$k$ of FIG. 4.

At block 1050, host interface logic 305 of FIG. 3 may determine whether it should automatically regenerate mapping 425 of FIG. 4 (either because window 605 of FIG. 6 is a sliding window or because SSD 120 has been configured to repeatedly collect new statistics in regular discrete windows 605 of FIG. 6). If so, then control may return to block 1005 of FIG. 10A to restart the process of generating mapping 425 of FIG. 4. Otherwise, at block 1055, host interface logic 305 of FIG. 3 may determine whether it has received a command to regenerate the mapping, as might be issued by machine 105 of FIG. 1 or a user of machine 105 of FIG. 1. If so, then control may return to block 1005 of FIG. 10A to restart the process of generating mapping 425 of FIG. 4. Otherwise, at block 1060, host interface logic 305 of FIG. 3 may retain mapping 425 of FIG. 4, after which processing may return to block 1030 of FIG. 10A (or alternatively, processing may simply end at this point, if no additional commands 405-1 through 405-k of FIG. 4 are to be received).

Figure 11:
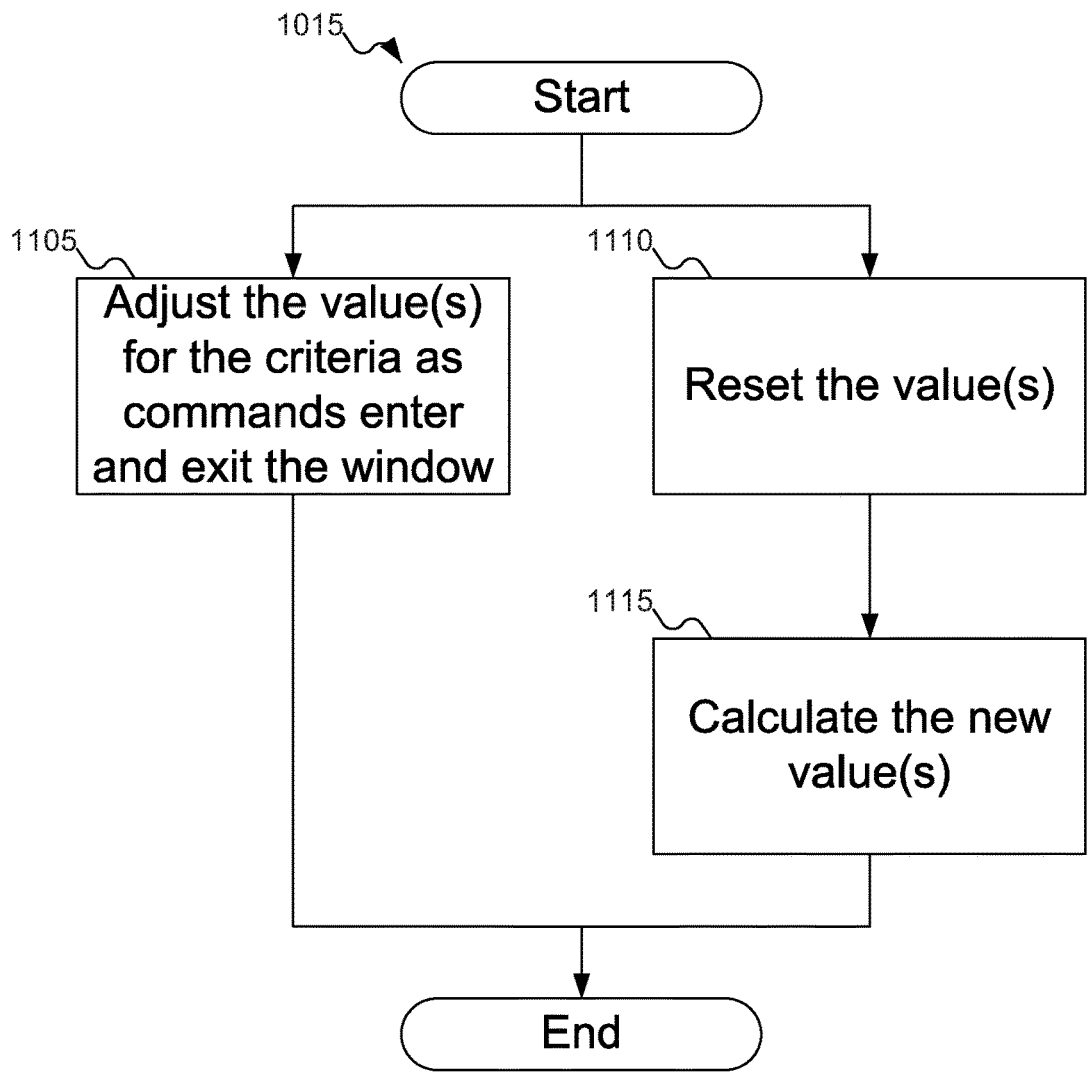
FIG. 11 shows a flowchart of an example procedure for the statistics collector of FIG. 5 to determine the values for criteria, according to an embodiment of the inventive concept.

FIG. 11 shows a flowchart of an example procedure for statistics collector 515 of FIG. 5 to determine the values for criteria 705 of FIG. 7, according to an embodiment of the inventive concept. In FIG. 11, at block 1105, statistics collector 515 of FIG. 5 may adjust the values for software streams 410-1 through 410-n of FIG. 4 as commands enter and exit window 605 of FIG. 6. That is, as commands enter window 605 of FIG. 6, statistics collector 515 of FIG. 5 may increase the values for software streams 410-1 through 410-n of FIG. 4, and as commands exit window 605 of FIG. 6, statistics collector 515 of FIG. 5 may decrease the values for software streams 410-1 through 410-n of FIG. 4.

Alternatively, at block 1110, statistics collector 515 of FIG. 5 may reset the values for software streams 410-1 through 410-n of FIG. 4. Then at block 1115, statistics collector 515 of FIG. 5 may collect new statistics for software streams 410-1 through 410-n of FIG. 4 over window 605 of FIG. 6.

Figure 12:
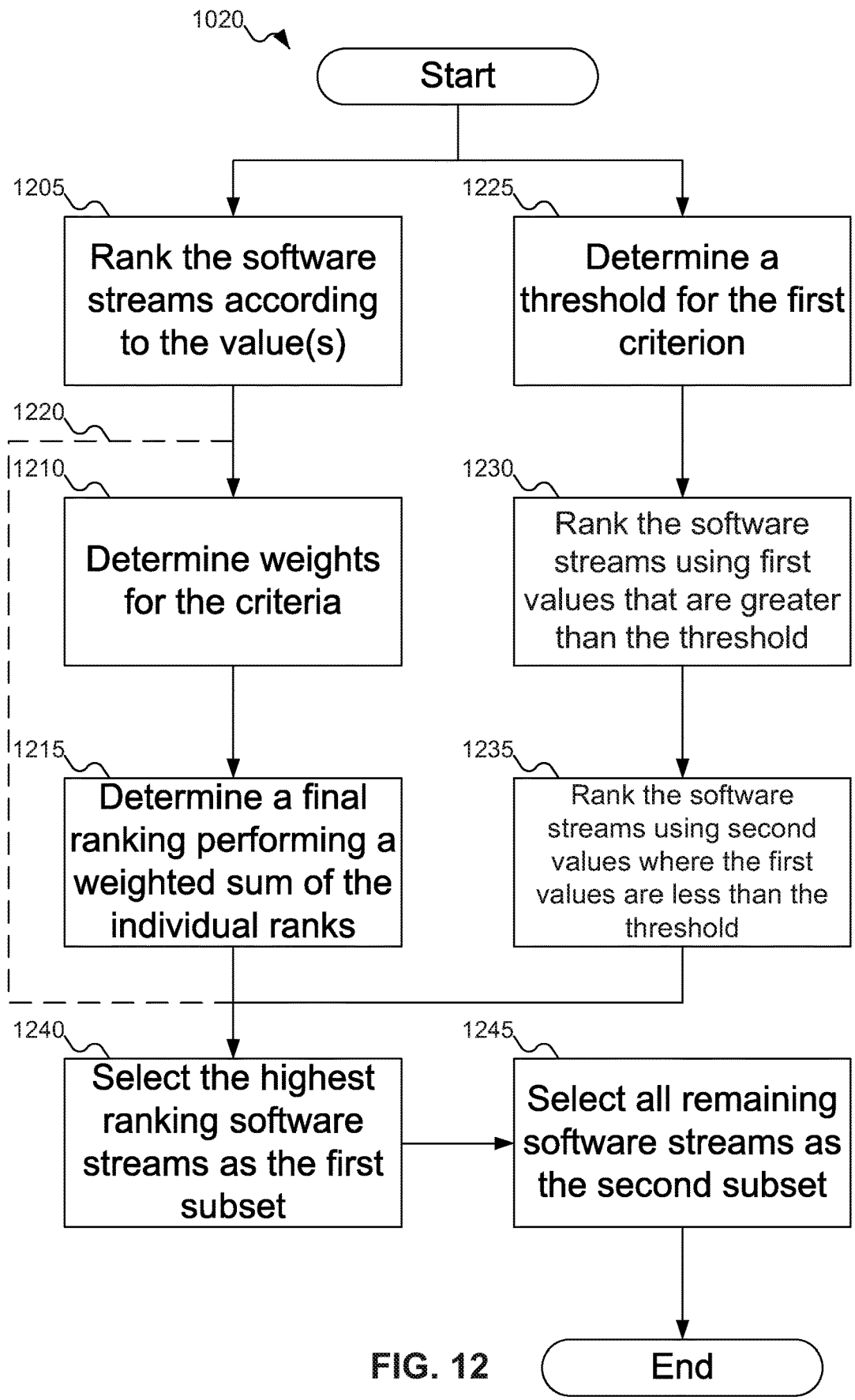
FIG. 12 shows a flowchart of an example procedure for the ranker of FIG. 5 to determine which software streams to map to which device streams, according to an embodiment of the inventive concept.

FIG. 12 shows a flowchart of an example procedure for ranker 520 of FIG. 5 to determine which software streams 410-1 through 410-n of FIG. 4 to map to which device streams 420-1 through 420-m of FIG. 4, according to an embodiment of the inventive concept. In FIG. 12, at block 1205, ranker 520 of FIG. 5 may rank software streams 410-1 through 410-n of FIG. 4 according to the statistics collected by statistics collector 515 of FIG. 5. At block 1210, ranker 520 of FIG. 5 may determine weights 825-1 through 825-l of FIG. 8 for the various criteria. At block 1215, ranker 520 may determine a final ranking of software streams 410-1 through 410-n of FIG. 4 using the initial ranks and weights 825-1 through 825-l of FIG. 8. As shown by dashed line 1220, blocks 1210 and 1215 may be omitted; also, as discussed above with reference to FIG. 8, ranking according to a single criterion may be effectively achieved even with blocks 1210 and 1215, if only one weight 825-1 through 825-l of FIG. 8 is given a positive non-zero value.

Alternatively, if ranker 520 of FIG. 5 uses multiple criteria using threshold 810 and comparator 815 of FIG. 8, then at block 1225, ranker 520 of FIG. 5 may determine threshold 810 of FIG. 8 for the first criterion (and for additional criteria, if more than one threshold 810 of FIG. 8 is used). At block 1230, software streams 410-1 through 410-n of FIG. 4 may be ranked according to the first criterion for software streams whose value for the first criterion exceeds threshold 810 of FIG. 8. At block 1235, software streams 410-1 through 410-n of FIG. 4 may be ranked according to the second criterion for software streams whose value for the first criterion does not exceed threshold 810 of FIG. 8.

Regardless of how ranker 520 of FIG. 5 achieves the final ranking, at block 1240 ranker 520 of FIG. 5 selects the highest ranking software streams for the first subset, and at block 1245 ranker 520 of FIG. 5 selects all the remaining software streams for the second subset.

Figure 13:
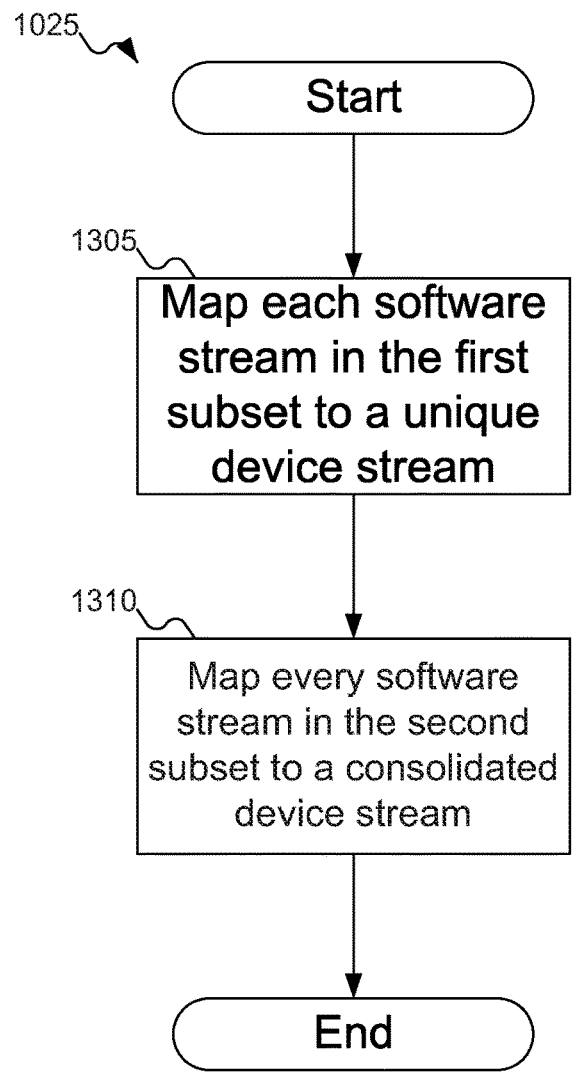
FIG. 13 shows a flowchart of an example procedure for the mapper of FIG. 5 to map software streams to device streams, according to an embodiment of the inventive concept.

FIG. 13 shows a flowchart of an example procedure for mapper 525 of FIG. 5 to map software streams 410-1 through 410-n of FIG. 4 to device streams 420-1 through 420-m of FIG. 4, according to an embodiment of the inventive concept. In FIG. 13, at block 1305, mapper 525 of FIG. 5 may map each software stream in the first subset to a unique device stream. At block 1310, mapper 525 of FIG. 5 may map each software stream in the second subset to a consolidated device stream. As described above with reference to FIG. 5, there may be more than one consolidated device stream, as needed.

In FIGS. 10A-13, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a Solid State Drive (SSD), comprising:
flash memory to store data;
support for a plurality of device streams in the SSD;
an SSD controller to manage reading data from and writing data to the flash memory responsive to a plurality of commands; and
a host interface logic, including:
a receiver to receive the plurality of commands from a host, the plurality of commands associated with a plurality of software streams;
a timer to time a window;
a statistics collector to determine at least one value for at least one criterion for each of the plurality of software streams during the window, responsive to the plurality of commands;
a ranker to rank the plurality of software streams according to the at least one value for the at least one criterion for each of the plurality of software streams; and
a mapper to establish a mapping, the mapping operative to map each software stream in a first subset of the plurality of software streams to a unique device stream in the plurality of device streams in the SSD and to map all of the software streams in a second subset of the plurality of software streams to a consolidated device stream of the plurality of device streams in the SSD.

Statement 2. An embodiment of the inventive concept includes an SSD according to statement 1, wherein:
each of the plurality of commands includes a software stream identifier (ID) tag identifying a corresponding one of the plurality of software streams, to which a corresponding device stream may be assigned responsive to the mapping; and
a result for each of the plurality of commands includes the software stream ID tag identifying the corresponding one of the plurality of software streams.

Statement 3. An embodiment of the inventive concept includes an SSD according to statement 1, wherein the SSD is operative to receive an additional plurality of commands from the plurality of software streams and assign the additional plurality of commands to the plurality of device streams according to the mapping.

Statement 4. An embodiment of the inventive concept includes an SSD according to statement 1, wherein:
the window is a sliding window; and
the statistics collector is operative to adjust the at least one value for the at least one criterion within the window as each of the plurality of commands enters and exits the window.

Statement 5. An embodiment of the inventive concept includes an SSD according to statement 1, wherein the window is a discrete window.

Statement 6. An embodiment of the inventive concept includes an SSD according to statement 5, wherein:
the host interface logic is operative to retain the mapping until instructed otherwise; and
the host interface logic includes a receiver to receive a command to re-map the plurality of software streams to the plurality of device streams.

Statement 7. An embodiment of the inventive concept includes an SSD according to statement 5, wherein the host interface logic is operative to iteratively re-map the plurality of software streams to the plurality of device streams for a plurality of sequential discrete windows.

Statement 8. An embodiment of the inventive concept includes an SSD according to statement 1, wherein:
the first subset of the plurality of software streams includes a number of software streams with highest ranking, wherein the number of software streams with highest ranking is one less than a number of the plurality of device streams; and
the second subset of the plurality of software streams includes all software streams not included in the first subset of the plurality of software streams.

Statement 9. An embodiment of the inventive concept includes an SSD according to statement 1, wherein the statistics collector is operative to determine a first value for a first criterion and a second value for a second criterion for each of the plurality of software streams.

Statement 10. An embodiment of the inventive concept includes an SSD according to statement 9, wherein:
the ranker includes a first weight for the first criterion and a second weight for the second criterion; and
the ranker is operative to rank the plurality of software streams according to a weighted sum of a first rank for the first value using the first weight and a second rank for the second value using the second weight.

Statement 11. An embodiment of the inventive concept includes an SSD according to statement 9, wherein:
the ranker includes a threshold for the first criterion; and
the ranker is operative to rank the plurality of software streams according to the first criterion for software streams whose first value is greater than the threshold for the first criterion and according to the second criterion for software streams whose first value is less than the threshold for the first criterion.

Statement 12. An embodiment of the inventive concept includes a driver for use in a computer system, comprising:
a receiver to receive a plurality of commands from a host, the plurality of commands associated with a plurality of software streams;

a timer to time a window;

a statistics collector to determine at least one value for at least one criterion for each of the plurality of software streams during the window, responsive to the plurality of commands;

a ranker to rank the plurality of software streams according to the at least one value for the at least one criterion for each of the plurality of software streams;

a mapper to establish a mapping, the mapping operative to map each software stream in a first subset of the plurality of software streams to a unique device stream in a plurality of device streams in a Solid State Drive (SSD) and to map all of the software streams in a second subset of the plurality of software streams to a consolidated device stream of the plurality of device streams in the SSD;

a device stream identifier (ID) adder to add to each of an additional plurality of commands a device stream ID for a device stream corresponding to a software stream associated with each of the plurality of commands; and a transmitter to transmit each of the additional plurality of commands to the SSD.

Statement 13. An embodiment of the inventive concept includes a driver according to statement 12, wherein the driver is operative to receive the additional plurality of commands from the plurality of software streams and assign the additional plurality of commands to the plurality of device streams according to the mapping.

Statement 14. An embodiment of the inventive concept includes a driver according to statement 12, wherein:

the window is a sliding window; and the statistics collector is operative to adjust the at least one value for the at least one criterion within the window as each of the plurality of commands enters and exits the window.

Statement 15. An embodiment of the inventive concept includes a driver according to statement 12, wherein the window is a discrete window.

Statement 16. An embodiment of the inventive concept includes a driver according to statement 15, wherein:

the driver is operative to retain the mapping until instructed otherwise; and the receiver is operative to receive a command to re-map the plurality of software streams to the plurality of device streams.

Statement 17. An embodiment of the inventive concept includes a driver according to statement 15, wherein the driver is operative to iteratively re-map the plurality of software streams to the plurality of device streams for a plurality of sequential discrete windows.

Statement 18. An embodiment of the inventive concept includes a driver according to statement 12, wherein:

the first subset of the plurality of software streams includes a number of software streams with highest ranking, wherein the number of software streams with highest ranking is one less than a number of the plurality of device streams; and the second subset of the plurality of software streams includes all software streams not included in the first subset of the plurality of software streams.

Statement 19. An embodiment of the inventive concept includes a driver according to statement 12, wherein the statistics collector is operative to determine a first value for a first criterion and a second value for a second criterion for each of the plurality of software streams.

Statement 20. An embodiment of the inventive concept includes a driver according to statement 19, wherein:

the ranker includes a first weight for the first criterion and a second weight for the second criterion; and the ranker is operative to rank the plurality of software streams according to a weighted sum of a first rank for the first value using the first weight and a second rank for the second value using the second weight.

Statement 21. An embodiment of the inventive concept includes a driver according to statement 19, wherein:

the ranker includes a threshold for the first criterion; and the ranker is operative to rank the plurality of software streams according to the first criterion for software streams whose first value is greater than the threshold for the first criterion and according to the second criterion for software streams whose first value is less than the threshold for the first criterion.

Statement 22. An embodiment of the inventive concept includes a method, comprising:

receiving a plurality of commands associated with a plurality of software streams, the plurality of commands to be processed using a Solid State Drive (SSD) including a plurality of device streams;

determining at least one value for at least one criterion for each of the plurality of software streams, responsive to the plurality of commands;

identifying first and second subsets of the plurality of software streams responsive to the at least one value for the at least one criterion;

generating a mapping, the mapping operative to map each software stream in the first subset of the plurality of software streams to a unique device stream of the plurality of device streams in the SSD and to map all of the software streams in the second subset of the plurality of software streams to a consolidated device stream of the plurality of device streams in the SSD;

receiving a second plurality of commands associated with the plurality of software streams after generating the mapping;

assigning each of the second plurality of commands to one of the plurality of device streams responsive to the mapping; and processing each of the second plurality of commands on the SSD using the assigned device stream.

Statement 23. An embodiment of the inventive concept includes a method according to statement 22, further comprising returning results from the SSD responsive to the processing of the plurality of commands associated with the plurality of software streams.

Statement 24. An embodiment of the inventive concept includes a method according to statement 22, wherein:

each of the plurality of commands associated with the plurality of software streams includes a software stream identifier (ID) tag; and each of the results from the SSD includes the software stream ID tag from a corresponding one of the plurality of commands associated with the plurality of software streams.

Statement 25. An embodiment of the inventive concept includes a method according to statement 22, identifying first and second subsets of the plurality of software streams responsive to the at least one value for the at least one criterion includes identifying the first and second subsets of the plurality of software streams responsive to the at least one value for the at least one criterion within a window.

Statement 26. An embodiment of the inventive concept includes a method according to statement 25, wherein the window is a sliding window.

Statement 27. An embodiment of the inventive concept includes a method according to statement 26, wherein determining at least one value for at least one criterion for each of the plurality of software streams includes adjusting the at least one value for the at least one criterion within the window as each of the plurality of commands enters and exits the window.

Statement 28. An embodiment of the inventive concept includes a method according to statement 25, wherein the window is a discrete window.

Statement 29. An embodiment of the inventive concept includes a method according to statement 28, further comprising:
identifying a second discrete window, the second discrete window including the second plurality of commands;
determining at least one second value for the at least one criterion responsive to the second plurality of commands during the second discrete window;
identifying third and fourth subsets of the plurality of software streams responsive to the at least one second value for the at least one criterion; and
generating a second mapping, the second mapping operative to map each software stream in the third subset of the plurality of software streams to a unique device stream of the plurality of device streams in the SSD and to map all of the software streams in the fourth subset of the plurality of software streams to a consolidated device stream of the plurality of device streams in the SSD.

Statement 30. An embodiment of the inventive concept includes a method according to statement 28, further comprising:
retaining the mapping after the discrete window closes;
receiving a request to remap the plurality of software streams to the plurality of device streams; and
performing the steps of identifying a second discrete window, determining at least one second value, identifying third and fourth subsets, and generating a second mapping responsive to the request to remap the plurality of software streams to the plurality of device streams.

Statement 31. An embodiment of the inventive concept includes a method according to statement 22, wherein identifying first and second subsets of the plurality of software streams responsive to the at least one value for the at least one criterion includes:
ranking the plurality of software streams according to the at least one value for the at least one criterion;
selecting the first subset of the plurality of software streams to contain a number of software streams with highest rankings, wherein the number of software streams with highest ranking is one less than a number of the plurality of device streams; and
selecting the second subset of the plurality of software streams to contain all software streams in the plurality of software streams not included in the first subset of the plurality of software streams.

Statement 32. An embodiment of the inventive concept includes a method according to statement 31, wherein:
determining at least one value for at least one criterion for each of the plurality of software streams, responsive to the plurality of commands, includes determining a first value for a first criterion and a second value for a second criterion for each of the plurality of software streams; and
ranking the plurality of software streams according to the at least one value for the at least one criterion includes ranking the plurality of software streams according to the first value for the first criterion and the second value for the second criterion for each of the plurality of software streams.

Statement 33. An embodiment of the inventive concept includes a method according to statement 32, wherein ranking the plurality of software streams according to the first value for the first criterion and the second value for the second criterion includes:
determining a first weight for the first criterion and a second weight for the second criterion; and
ranking the plurality of software streams according to a weighted sum of a first rank for the first value using the first weight and a second rank for the second value using the second weight.

Statement 34. An embodiment of the inventive concept includes a method according to statement 32, wherein ranking the plurality of software streams according to the first value for the first criterion and the second value for the second criterion includes:
determining a threshold for the first criterion; and
ranking the plurality of software streams according to the first criterion for software streams whose first value is greater than the threshold for the first criterion and according to the second criterion for software streams whose first value is less than the threshold for the first criterion.

Statement 35. An embodiment of the inventive concept includes an article comprising a tangible storage medium, the tangible storage medium having stored thereon non-transitory instructions that, when executed by a machine, result in:
receiving a plurality of commands associated with a plurality of software streams, the plurality of commands to be processed using a Solid State Drive (SSD) including a plurality of device streams;
determining at least one value for at least one criterion for each of the plurality of software streams, responsive to the plurality of commands;
identifying first and second subsets of the plurality of software streams responsive to the at least one value for the at least one criterion;
generating a mapping, the mapping operative to map each software stream in the first subset of the plurality of software streams to a unique device stream of the plurality of device streams in the SSD and to map all of the software streams in the second subset of the plurality of software streams to a consolidated device stream of the plurality of device streams in the SSD;
receiving a second plurality of commands associated with the plurality of software streams after generating the mapping;
assigning each of the second plurality of commands to one of the plurality of device streams responsive to the mapping; and
processing each of the second plurality of commands on the SSD using the assigned device stream.

Statement 36. An embodiment of the inventive concept includes an article according to statement 35, the tangible storage medium having stored thereon further non-transitory instructions that, when executed by the machine, result in returning results from the SSD responsive to the processing of the plurality of commands associated with the plurality of software streams.

Statement 37. An embodiment of the inventive concept includes an article according to statement 35, wherein:
each of the plurality of commands associated with the plurality of software streams includes a software stream identifier (ID) tag; and
each of the results from the SSD includes the software stream ID tag from a corresponding one of the plurality of commands associated with the plurality of software streams.

Statement 38. An embodiment of the inventive concept includes an article according to statement 35, identifying first and second subsets of the plurality of software streams responsive to the at least one value for the at least one criterion includes identifying the first and second subsets of the plurality of software streams responsive to the at least one value for the at least one criterion within a window.

Statement 39. An embodiment of the inventive concept includes an article according to statement 38, wherein the window is a sliding window.

Statement 40. An embodiment of the inventive concept includes an article according to statement 39, wherein determining at least one value for at least one criterion for each of the plurality of software streams includes adjusting the at least one value for the at least one criterion within the window as each of the plurality of commands enters and exits the window.

Statement 41. An embodiment of the inventive concept includes an article according to statement 38, wherein the window is a discrete window.

Statement 42. An embodiment of the inventive concept includes an article according to statement 41, the tangible storage medium having stored thereon further non-transitory instructions that, when executed by the machine, result in:
 identifying a second discrete window, the second discrete window including the second plurality of commands;
 determining at least one second value for the at least one criterion responsive to the second plurality of commands during the second discrete window;
 identifying third and fourth subsets of the plurality of software streams responsive to the at least one second value for the at least one criterion; and
 generating a second mapping, the second mapping operative to map each software stream in the third subset of the plurality of software streams to a unique device stream of the plurality of device streams in the SSD and to map all of the software streams in the fourth subset of the plurality of software streams to a consolidated device stream of the plurality of device streams in the SSD.

Statement 43. An embodiment of the inventive concept includes an article according to statement 41, the tangible storage medium having stored thereon further non-transitory instructions that, when executed by the machine, result in:
 retaining the mapping after the discrete window closes;
 receiving a request to remap the plurality of software streams to the plurality of device streams; and
 performing the steps of identifying a second discrete window, determining at least one second value, identifying third and fourth subsets, and generating a second mapping responsive to the request to remap the plurality of software streams to the plurality of device streams.

Statement 44. An embodiment of the inventive concept includes an article according to statement 35, wherein identifying first and second subsets of the plurality of software streams responsive to the at least one value for the at least one criterion includes:
 ranking the plurality of software streams according to the at least one value for the at least one criterion;
 selecting the first subset of the plurality of software streams to contain a number of software streams with highest rankings, wherein the number of software streams with highest ranking is one less than a number of the plurality of device streams; and
 selecting the second subset of the plurality of software streams to contain all software streams in the plurality of software streams not included in the first subset of the plurality of software streams.

Statement 45. An embodiment of the inventive concept includes an article according to statement 44, wherein:
 determining at least one value for at least one criterion for each of the plurality of software streams, responsive to the plurality of commands, includes determining a first value for a first criterion and a second value for a second criterion for each of the plurality of software streams; and
 ranking the plurality of software streams according to the at least one value for the at least one criterion includes ranking the plurality of software streams according to the first value for the first criterion and the second value for the second criterion for each of the plurality of software streams.

Statement 46. An embodiment of the inventive concept includes an article according to statement 45, wherein ranking the plurality of software streams according to the first value for the first criterion and the second value for the second criterion includes:
 determining a first weight for the first criterion and a second weight for the second criterion; and
 ranking the plurality of software streams according to a weighted sum of a first rank for the first value using the first weight and a second rank for the second value using the second weight.

Statement 47. An embodiment of the inventive concept includes an article according to statement 45, wherein ranking the plurality of software streams according to the first value for the first criterion and the second value for the second criterion includes:
 determining a threshold for the first criterion; and
 ranking the plurality of software streams according to the first criterion for software streams whose first value is greater than the threshold for the first criterion and according to the second criterion for software streams whose first value is less than the threshold for the first criterion.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A Solid State Drive (SSD), comprising:
 flash memory to store data;
 support for at least a first device stream and a second device stream in the SSD;
 an SSD controller to manage reading data from and writing data to the flash memory responsive to a first command and a second command; and
 a host interface logic implemented using at least a circuit, including:
  a receiver to receive the first command associated with a first software stream and the second command associated with a second software stream from a host;
  a timer to time a window;
  a statistics collector to determine a first value for a criterion for the first software stream during the window and a second value for the criterion for the second software stream during the window, responsive to the first command and the second command;
  a ranker to rank the first software stream and the second software stream according to the first value for the criterion for the first software stream and the second value for the criterion for the second software stream; and
  a mapper to establish a mapping, the mapping operative to map a third software stream in a first subset of the first software stream and the second software stream to a unique device stream in the first device stream and the second device stream in the SSD and to map a fourth software stream in a second subset of the first software stream and the second software stream to a consolidated device stream of the first device stream and the second device stream in the SSD,
wherein the first command is assigned to the unique device stream and the second command is assigned to the consolidated device stream.

2. An SSD according to claim 1, wherein the SSD is operative to receive at least a third command associated with the first software stream and assign the third command to one of the unique device stream or the consolidated device stream according to the mapping.

3. An SSD according to claim 1, wherein:
the window is a sliding window; and
the statistics collector is operative to adjust the value for the criterion within the window as the first command and the second command enter and exit the window.

4. An SSD according to claim 1, wherein the window is a discrete window.

5. An SSD according to claim 1, wherein:
the first subset of the first software stream and the second software stream includes a number of software streams with highest ranking, wherein the number of software streams with highest ranking is one less than the at least a first device stream and a second device stream; and
the second subset of the first software stream and the second software stream includes at least one software stream not included in the first subset of the first software stream and the second software stream.

6. An SSD according to claim 1, wherein the statistics collector is operative to determine the first value for the criterion and a third value for a second criterion for the first software stream and the second value for the criterion and a fourth value for the second criterion for the second software stream.

7. An SSD according to claim 6, wherein:
the ranker includes a first weight for the criterion and a second weight for the second criterion; and
the ranker is operative to rank the first software stream according to a weighted sum of a first rank for the first value using the first weight and a second rank for the third value using the second weight, and to rank the second software stream according to a weighted sum of a third rank for the second value using the first weight and a fourth rank for the fourth value using the second weight.

8. An SSD according to claim 6, wherein:
the ranker includes a threshold for the criterion; and
the ranker is operative to rank the first software stream according to the criterion for software streams whose value for the criterion is greater than the threshold for the criterion and according to the second criterion for software streams whose value for the criterion is less than the threshold for the criterion.

9. An article comprising a tangible, non-transitory storage medium, the tangible, non-transitory storage medium having stored thereon a driver that may be executed by a machine, the driver including:
a receiver to receive the first command associated with a first software stream and the second command associated with a second software stream from a host;
a timer to time a window;
a statistics collector to determine a first value for a criterion for the first software stream during the window and a second value for the criterion for the second software stream during the window, responsive to the first command and the second command;
a ranker to rank the first software stream and the second software stream according to the first value for the criterion for the first software stream and the second value for the criterion for the second software stream;
a mapper to establish a mapping, the mapping operative to map a third software stream in a first subset of the first software stream and the second software stream to a unique device stream in at least a first device stream and a second device stream in the SSD and to map a fourth software stream in a second subset of the first software stream and the second software stream to a consolidated device stream of the first device stream and the second device stream in the SSD;
a device stream identifier (ID) adder to add to a third command a device stream ID for a device stream corresponding to a software stream associated with the third command; and
a transmitter to transmit the third command to the SSD.

10. An article according to claim 9, wherein:
the window is a sliding window; and
the statistics collector is operative to adjust the value for the criterion within the window as the first command, the second command, and the third command enter and exit the window.

11. An article according to claim 9, wherein the window is a discrete window.

12. An article according to claim 9, wherein:
the first subset of the first software stream and the second software stream includes a number of software streams with highest rankings, wherein the number of software streams with highest rankings is one less than a number of the at least a first device stream and a second device stream; and
the second subset of the first software stream and the second software stream includes software streams not included in the first subset of the first software stream and the second software.

13. An article according to claim 9, wherein the statistics collector is operative to determine the first value for the criterion and a third value for a second criterion for the first software stream, and to determine the second value for the criterion and a fourth value for the second criterion for the second software stream.

14. An article according to claim 13, wherein:
the ranker includes a first weight for the criterion and a second weight for the second criterion; and
the ranker is operative to rank the first software stream according to a weighted sum of a first rank for the first value using the first weight and a second rank for the third value using the second weight, and to rank the second software stream according to a weighted sum of a third rank for the second value using the first weight and a fourth rank for the fourth value using the second weight.

15. An article according to claim 13, wherein:
the ranker includes a threshold for the criterion; and
the ranker is operative to rank the first software stream and the second software stream according to the criterion for software streams whose value is greater than the threshold for the criterion and according to the second criterion for software streams whose value is less than the threshold for the first criterion.

16. A method, comprising:
receiving a first command associated with a first software stream and a second associated with a second software stream, the first command and the second command to be processed using a Solid State Drive (SSD) including at least a first device stream and a second device stream;
determining a first value for a criterion for the first software stream and a second value for the criterion for the second software stream, responsive to the first command and the second command;
identifying first and second subsets of the first software stream and the second software stream responsive to the first value for the criterion and the second value for the criterion;
generating a mapping, the mapping operative to map a third software stream in a first subset of the first software stream and the second software stream to a unique device stream in the first device stream and the second device stream in the SSD and to map a fourth software stream in a second subset of the first software stream and the second software stream to a consolidated device stream of the first device stream and the second device stream in the SSD;
receiving a third command associated with one of the first software stream or the second software stream after generating the mapping;
assigning the third command to one of the unique device stream or the consolidated device stream responsive to the mapping; and
processing the third command on the SSD using the assigned device stream.

17. A method according to claim 16, wherein identifying first and second subsets of the first software stream and the second software stream responsive to the first value for the criterion and the second value for the criterion includes:
ranking the first software stream and the second software stream according to the first value for the criterion and the second value for the first criterion;
selecting the first subset of the first software stream and the second software stream to contain a number of software streams with highest rankings, wherein the number of software streams with highest ranking is one less than the at least a first device stream and a second device stream; and
selecting the second subset of the subset of the first software stream and the second software stream to contain software streams in the first software stream and the second software stream not included in the first subset of the first software stream and the second software stream.

18. A method according to claim 17, wherein:
determining a first value for a criterion for the first software stream and a second value for the criterion for the second software stream, responsive to the first command and the second command, includes:
determining the first value for the criterion and a third value for a second criterion for the first software stream; and
determining the second value for the criterion and a fourth value for the second criterion for the second software stream; and
ranking the first software stream and the second software stream according to the at least one value for the at least one criterion includes ranking the first software stream and the second software stream according to the first value for the criterion for the first software stream, the second value for the criterion for the second software stream, the third value for the second criterion for the first software stream, and the fourth value for the second criterion for the second software stream.

19. A method according to claim 18, wherein ranking the first software stream and the second software stream according to the first value for the criterion for the first software stream, the second value for the criterion for the second software stream, the third value for the second criterion for the first software stream, and the fourth value for the second criterion for the second software stream includes:
determining a first weight for the first criterion and a second weight for the second criterion;
ranking the first software stream according to a weighted sum of a first rank for the first value using the first weight and a second rank for the third value using the second weight; and
ranking the second software stream according to a weighted sum of a third rank for the second value using the first weight and a fourth rank for the fourth value using the second weight.

20. A method according to claim 18, wherein ranking the first software stream and the second software stream according to the first value for the criterion for the first software stream, the second value for the criterion for the second software stream, the third value for the second criterion for the first software stream, and the fourth value for the second criterion for the second software stream includes:
determining a threshold for the criterion; and
ranking the first software stream and the second software stream according to the criterion for software streams whose value is greater than the threshold for the criterion and according to the second criterion for software streams whose value is less than the threshold for the criterion.

* * * * *